(12) United States Patent
　　Wilton

(10) Patent No.: US 12,656,498 B2
(45) Date of Patent: Jun. 16, 2026

(54) SYSTEMS AND METHODS FOR SPATIAL PROCESSING OF LIDAR DATA

(71) Applicant: LG INNOTEK CO., LTD., Seoul (KR)

(72) Inventor: Samuel Richard Wilton, Levittown, PA (US)

(73) Assignee: LG INNOTEK CO., LTD., Seoul (KR)

( * ) Notice: Subject to any disclaimer, the term of this patent is extended or adjusted under 35 U.S.C. 154(b) by 445 days.

(21) Appl. No.: 18/051,610

(22) Filed: Nov. 1, 2022

(65) Prior Publication Data

US 2024/0069207 A1　　Feb. 29, 2024

Related U.S. Application Data

(60) Provisional application No. 63/401,748, filed on Aug. 29, 2022.

(51) Int. Cl.
　　*G01S 17/931*　　(2020.01)
　　*B60W 60/00*　　(2020.01)
　　*G01S 7/481*　　(2006.01)

(52) U.S. Cl.
　　CPC ......... *G01S 17/931* (2020.01); *B60W 60/001* (2020.02); *G01S 7/4816* (2013.01); *B60W 2420/408* (2024.01)

(58) Field of Classification Search
　　CPC .. G01S 17/931; G01S 7/4816; B60W 60/001; B60W 2420/408
　　See application file for complete search history.

(56) References Cited

U.S. PATENT DOCUMENTS

| | | | |
|---|---|---|---|
| 10,976,417 B2 | 4/2021 | LaChapelle et al. | |
| 2007/0183682 A1* | 8/2007 | Weiss | G06T 5/20 |
| | | | 382/262 |
| 2012/0311171 A1 | 12/2012 | Holley et al. | |
| 2017/0273161 A1* | 9/2017 | Nakamura | G01S 7/484 |

(Continued)

OTHER PUBLICATIONS

Anonymous, "Binomial proportion confidence interval", Wikipedia, Aug. 2, 2022, retrieved at https://en.wikipedia.org/w/index.php?title+Binomial_porportion_confidence_interval&oldid=1101942017 (10 pages).

(Continued)

*Primary Examiner* — Anne Marie Antonucci
*Assistant Examiner* — Patrick M Brady
(74) *Attorney, Agent, or Firm* — Birch, Stewart, Kolasch & Birch, LLP

(57) ABSTRACT

Disclosed herein are systems, methods, and computer program products for operating a lidar system. The methods comprise: arranging, by the processor, a plurality of pixels in a grid (the pixels comprising result values generated from processing waveforms produced by photodetectors of the lidar system); identifying, by the processor, a first region of interest in the grid based on correlations between range values associated with the plurality of pixels and/or correlations between intensity values associated with the plurality of pixels; combining, by the processor, result values associated with pixels located within the first region of interest to produce first feature value(s); and generating, by the processor, a first superpixel having value(s) set to the first feature value(s).

17 Claims, 19 Drawing Sheets

(56) References Cited

U.S. PATENT DOCUMENTS

| | | | |
|---|---|---|---|
| 2017/0299721 A1 | 10/2017 | Eichenholz et al. | |
| 2018/0136314 A1* | 5/2018 | Taylor | G01S 17/931 |
| 2018/0180739 A1 | 6/2018 | Droz | |
| 2018/0284234 A1 | 10/2018 | Curatu | |
| 2018/0284275 A1 | 10/2018 | LaChapelle | |
| 2019/0107606 A1 | 4/2019 | Russell et al. | |
| 2019/0124277 A1* | 4/2019 | Mabuchi | G03B 17/02 |
| 2019/0235081 A1 | 8/2019 | Smits | |
| 2020/0256964 A1 | 8/2020 | Campbell et al. | |
| 2020/0271788 A1 | 8/2020 | Lewis | |
| 2020/0284883 A1 | 9/2020 | Ferreira et al. | |
| 2020/0300990 A1 | 9/2020 | Eichenholz | |
| 2021/0396887 A1 | 12/2021 | Schmalenberg | |
| 2022/0099814 A1 | 3/2022 | Finkelstein et al. | |
| 2022/0118555 A1 | 4/2022 | Sibley et al. | |
| 2022/0179071 A1 | 6/2022 | Pacala et al. | |
| 2022/0236417 A1 | 7/2022 | LaChapelle et al. | |
| 2022/0291387 A1* | 9/2022 | Pacala | G01S 7/4815 |
| 2022/0317267 A1 | 10/2022 | Voicu et al. | |
| 2023/0008801 A1 | 1/2023 | Klemme et al. | |
| 2023/0046274 A1 | 2/2023 | Chen et al. | |
| 2023/0057118 A1* | 2/2023 | Bankiti | G06T 7/20 |
| 2023/0134302 A1 | 5/2023 | Herman et al. | |
| 2023/0148066 A1 | 5/2023 | Benscoter et al. | |
| 2023/0243919 A1* | 8/2023 | Day | G01S 7/4873 |
| | | | 356/4.01 |
| 2023/0366993 A1 | 11/2023 | Sun et al. | |
| 2024/0069167 A1 | 2/2024 | Song | |
| 2024/0310495 A1 | 9/2024 | Zhu et al. | |
| 2024/0310851 A1 | 9/2024 | Afrouzi et al. | |
| 2025/0076509 A1 | 3/2025 | Terefe | |
| 2025/0085409 A1 | 3/2025 | Voicu et al. | |
| 2025/0334697 A1 | 10/2025 | Griffis | |

OTHER PUBLICATIONS

Cong et al., "Image segmentation algorithm based on superpixel clustering", IET Image Process., 2018, 12(11): 2030-2035.

Dev et al., "Nighttime Sky/Cloud Image Segmentation", May 2017 (5 pages).

Yang et al., "Superpixel Segmentation with Fully Convolutional Networks", 2020 (17 pages).

* cited by examiner

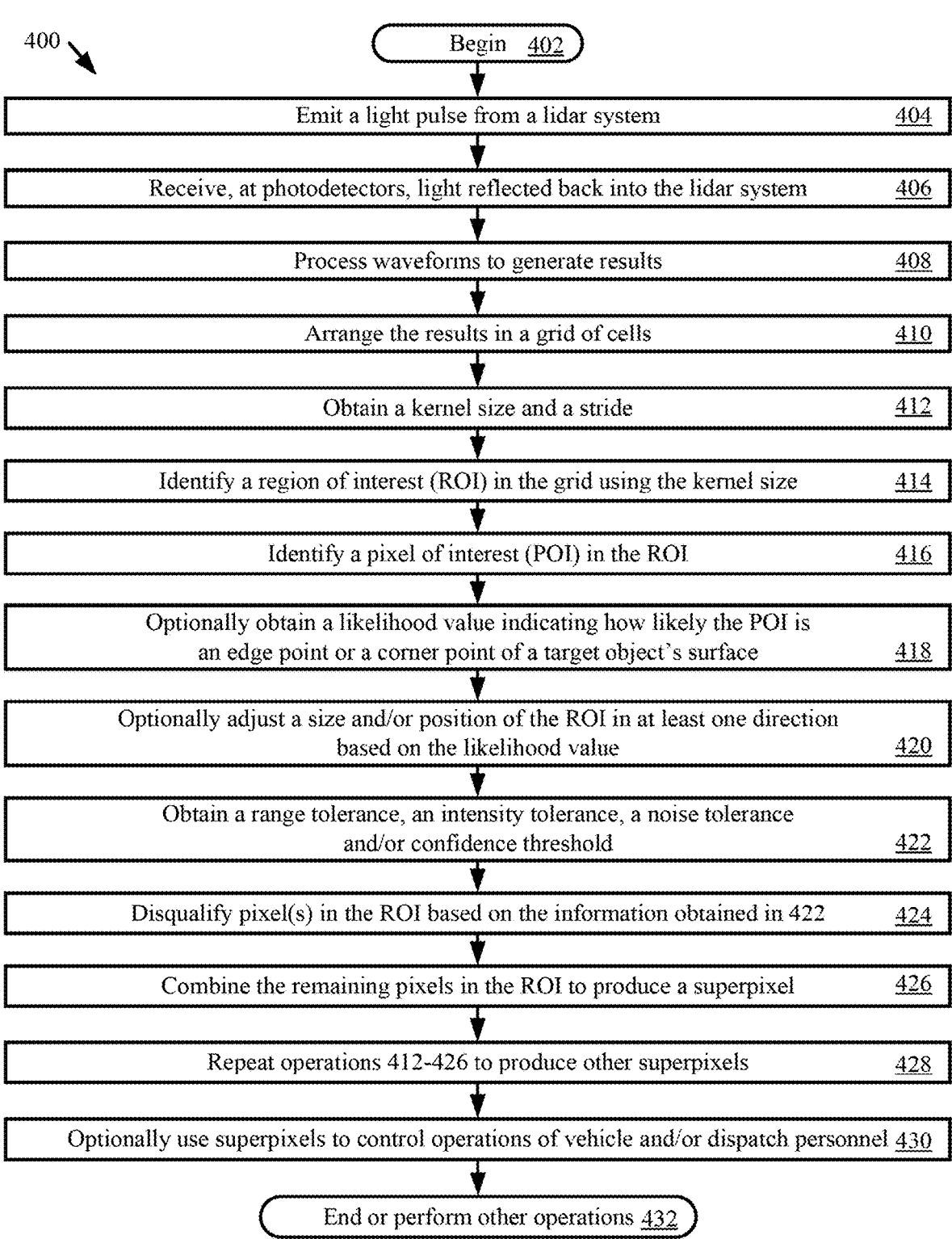

400

| Begin 402 |

| Emit a light pulse from a lidar system | 404 |

| Receive, at photodetectors, light reflected back into the lidar system | 406 |

| Process waveforms to generate results | 408 |

| Arrange the results in a grid of cells | 410 |

| Obtain a kernel size and a stride | 412 |

| Identify a region of interest (ROI) in the grid using the kernel size | 414 |

| Identify a pixel of interest (POI) in the ROI | 416 |

| Optionally obtain a likelihood value indicating how likely the POI is an edge point or a corner point of a target object's surface | 418 |

| Optionally adjust a size and/or position of the ROI in at least one direction based on the likelihood value | 420 |

| Obtain a range tolerance, an intensity tolerance, a noise tolerance and/or confidence threshold | 422 |

| Disqualify pixel(s) in the ROI based on the information obtained in 422 | 424 |

| Combine the remaining pixels in the ROI to produce a superpixel | 426 |

| Repeat operations 412-426 to produce other superpixels | 428 |

| Optionally use superpixels to control operations of vehicle and/or dispatch personnel 430 |

| End or perform other operations 432 |

Grid 500

ROI 504

Pixel of Interest (POI) 506

FIG. 5B

Cell 502

Grid 500

Kernel Size = M×N = 4×4

Region of Interest (ROI) 504'

Grid 500

$$F_2 = f(p_5, p_6, p_7, p_8, p_{17}, p_{18}, p_{29}, p_{30}, p_{31}, p_{32}, p_{41}, p_{42}, p_{43}, p_{44})$$

510

512

| $F_1$ | $F_2$ |
| $F_3$ | $F_4$ |
| $F_5$ | $F_6$ |
| $F_7$ | $F_8$ |
| $F_9$ | $F_{10}$ |
| $F_{11}$ | $F_{12}$ |

FIG. 5G

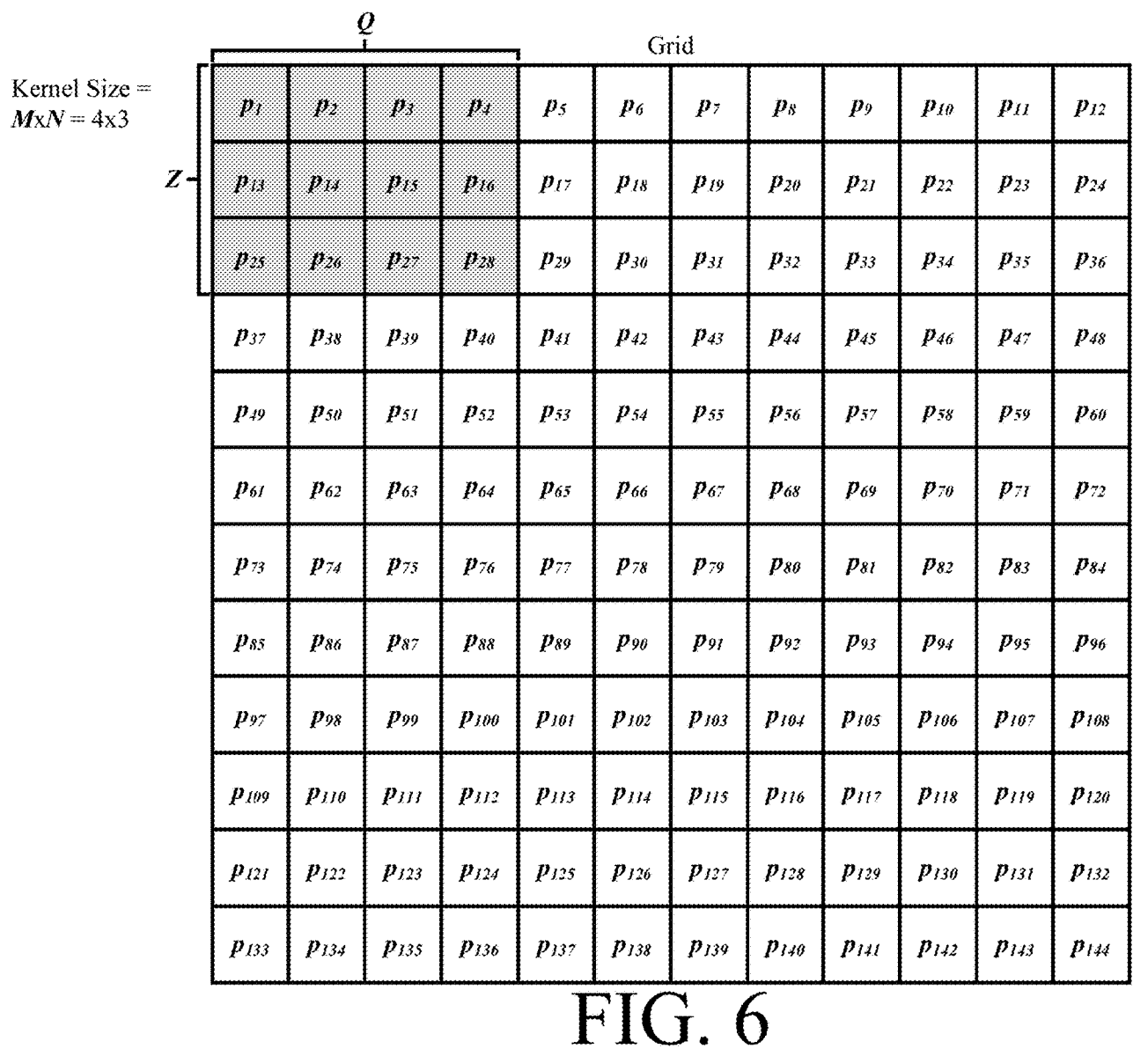

Grid

| | $p_{12}$ | $p_{24}$ | $p_{36}$ | $p_{48}$ | $p_{60}$ | $p_{72}$ | $p_{84}$ | $p_{96}$ | $p_{108}$ | $p_{120}$ | $p_{132}$ | $p_{144}$ |
| | $p_{11}$ | $p_{23}$ | $p_{35}$ | $p_{47}$ | $p_{59}$ | $p_{71}$ | $p_{83}$ | $p_{95}$ | $p_{107}$ | $p_{119}$ | $p_{131}$ | $p_{143}$ |
| | $p_{10}$ | $p_{22}$ | $p_{34}$ | $p_{46}$ | $p_{58}$ | $p_{70}$ | $p_{82}$ | $p_{94}$ | $p_{106}$ | $p_{118}$ | $p_{130}$ | $p_{142}$ |
| | $p_{9}$ | $p_{21}$ | $p_{33}$ | $p_{45}$ | $p_{57}$ | $p_{69}$ | $p_{81}$ | $p_{93}$ | $p_{105}$ | $p_{117}$ | $p_{129}$ | $p_{141}$ |
| | $p_{8}$ | $p_{20}$ | $p_{32}$ | $p_{44}$ | $p_{56}$ | $p_{68}$ | $p_{80}$ | $p_{92}$ | $p_{104}$ | $p_{116}$ | $p_{128}$ | $p_{140}$ |
| | $p_{7}$ | $p_{19}$ | $p_{31}$ | $p_{43}$ | $p_{55}$ | $p_{67}$ | $p_{79}$ | $p_{91}$ | $p_{103}$ | $p_{115}$ | $p_{127}$ | $p_{139}$ |
| | $p_{6}$ | $p_{18}$ | $p_{30}$ | $p_{42}$ | $p_{54}$ | $p_{66}$ | $p_{78}$ | $p_{90}$ | $p_{102}$ | $p_{114}$ | $p_{126}$ | $p_{138}$ |
| | $p_{5}$ | $p_{17}$ | $p_{29}$ | $p_{41}$ | $p_{53}$ | $p_{65}$ | $p_{77}$ | $p_{89}$ | $p_{101}$ | $p_{113}$ | $p_{125}$ | $p_{137}$ |
| | $p_{4}$ | $p_{16}$ | $p_{28}$ | $p_{40}$ | $p_{52}$ | $p_{64}$ | $p_{76}$ | $p_{88}$ | $p_{100}$ | $p_{112}$ | $p_{124}$ | $p_{136}$ |
| Q | $p_{3}$ | $p_{15}$ | $p_{27}$ | $p_{39}$ | $p_{51}$ | $p_{63}$ | $p_{75}$ | $p_{87}$ | $p_{99}$ | $p_{111}$ | $p_{123}$ | $p_{135}$ |
| | $p_{2}$ | $p_{14}$ | $p_{26}$ | $p_{38}$ | $p_{50}$ | $p_{62}$ | $p_{74}$ | $p_{86}$ | $p_{98}$ | $p_{110}$ | $p_{122}$ | $p_{134}$ |
| | $p_{1}$ | $p_{13}$ | $p_{25}$ | $p_{37}$ | $p_{49}$ | $p_{61}$ | $p_{73}$ | $p_{85}$ | $p_{97}$ | $p_{109}$ | $p_{121}$ | $p_{133}$ |

Z

Kernel Size =
$M \times N = 4 \times 3$

FIG. 6

Grid

Kernel Size = $M$x$N$ = 3x4

$Q$ $Z$

| | | | | | | | | | | | |
|---|---|---|---|---|---|---|---|---|---|---|---|
| $P_1$ | $P_2$ | $P_3$ | $P_4$ | $P_5$ | $P_6$ | $P_7$ | $P_8$ | $P_9$ | $P_{10}$ | $P_{11}$ | $P_{12}$ |
| $P_{13}$ | $P_{14}$ | $P_{15}$ | $P_{16}$ | $P_{17}$ | $P_{18}$ | $P_{19}$ | $P_{20}$ | $P_{21}$ | $P_{22}$ | $P_{23}$ | $P_{24}$ |
| $P_{25}$ | $P_{26}$ | $P_{27}$ | $P_{28}$ | $P_{29}$ | $P_{30}$ | $P_{31}$ | $P_{32}$ | $P_{33}$ | $P_{34}$ | $P_{35}$ | $P_{36}$ |
| $P_{37}$ | $P_{38}$ | $P_{39}$ | $P_{40}$ | $P_{41}$ | $P_{42}$ | $P_{43}$ | $P_{44}$ | $P_{45}$ | $P_{46}$ | $P_{47}$ | $P_{48}$ |
| $P_{49}$ | $P_{50}$ | $P_{51}$ | $P_{52}$ | $P_{53}$ | $P_{54}$ | $P_{55}$ | $P_{56}$ | $P_{57}$ | $P_{58}$ | $P_{59}$ | $P_{60}$ |
| $P_{61}$ | $P_{62}$ | $P_{63}$ | $P_{64}$ | $P_{65}$ | $P_{66}$ | $P_{67}$ | $P_{68}$ | $P_{69}$ | $P_{70}$ | $P_{71}$ | $P_{72}$ |
| $P_{73}$ | $P_{74}$ | $P_{75}$ | $P_{76}$ | $P_{77}$ | $P_{78}$ | $P_{79}$ | $P_{80}$ | $P_{81}$ | $P_{82}$ | $P_{83}$ | $P_{84}$ |
| $P_{85}$ | $P_{86}$ | $P_{87}$ | $P_{88}$ | $P_{89}$ | $P_{90}$ | $P_{91}$ | $P_{92}$ | $P_{93}$ | $P_{94}$ | $P_{95}$ | $P_{96}$ |
| $P_{97}$ | $P_{98}$ | $P_{99}$ | $P_{100}$ | $P_{101}$ | $P_{102}$ | $P_{103}$ | $P_{104}$ | $P_{105}$ | $P_{106}$ | $P_{107}$ | $P_{108}$ |
| $P_{109}$ | $P_{110}$ | $P_{111}$ | $P_{112}$ | $P_{113}$ | $P_{114}$ | $P_{115}$ | $P_{116}$ | $P_{117}$ | $P_{118}$ | $P_{119}$ | $P_{120}$ |
| $P_{121}$ | $P_{122}$ | $P_{123}$ | $P_{124}$ | $P_{125}$ | $P_{126}$ | $P_{127}$ | $P_{128}$ | $P_{129}$ | $P_{130}$ | $P_{131}$ | $P_{132}$ |
| $P_{133}$ | $P_{134}$ | $P_{135}$ | $P_{136}$ | $P_{137}$ | $P_{138}$ | $P_{139}$ | $P_{140}$ | $P_{141}$ | $P_{142}$ | $P_{143}$ | $P_{144}$ |

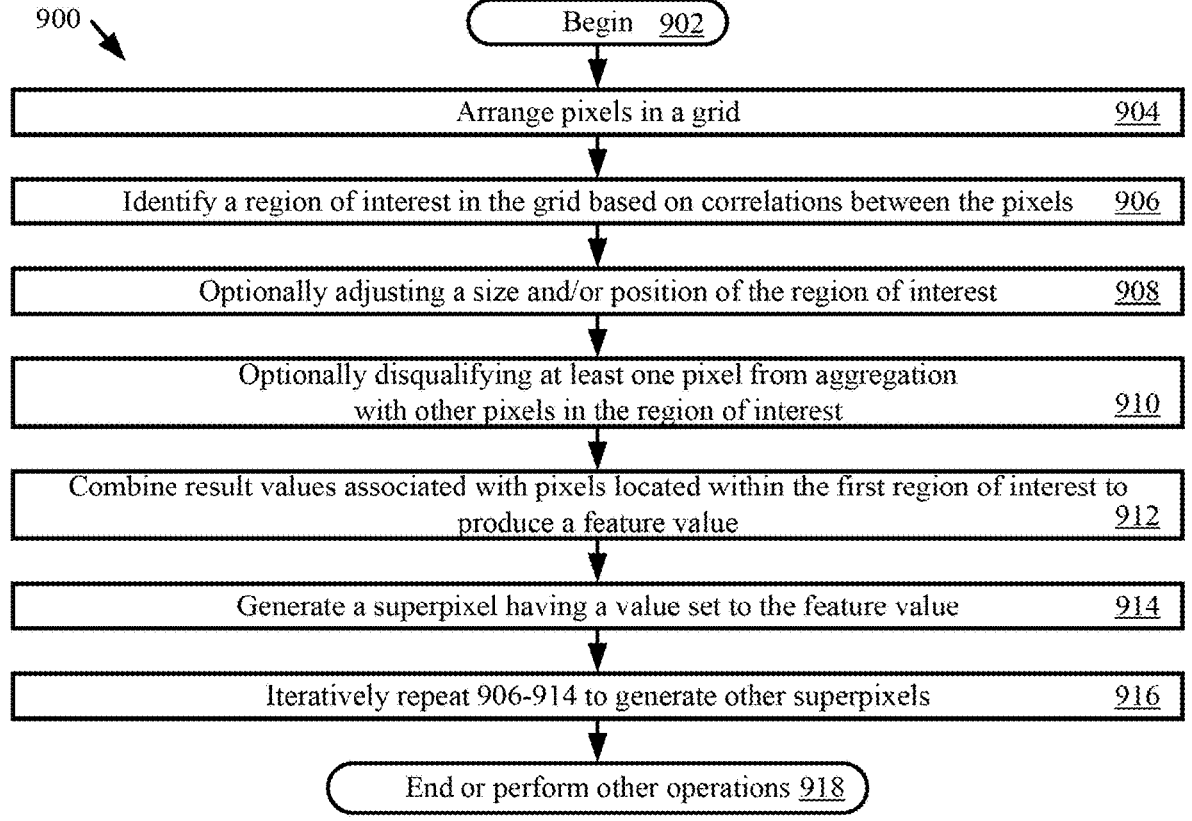

900

Begin  902

Arrange pixels in a grid  904

Identify a region of interest in the grid based on correlations between the pixels  906

Optionally adjusting a size and/or position of the region of interest  908

Optionally disqualifying at least one pixel from aggregation
with other pixels in the region of interest  910

Combine result values associated with pixels located within the first region of interest to
produce a feature value  912

Generate a superpixel having a value set to the feature value  914

Iteratively repeat 906-914 to generate other superpixels  916

End or perform other operations  918

FIG. 9

SYSTEMS AND METHODS FOR SPATIAL PROCESSING OF LIDAR DATA

CROSS-REFERENCE TO RELATED APPLICATIONS

The present application claims priority to and the benefit of U.S. Provisional Patent Application Ser. No. 63/401,748 which was filed on Aug. 29, 2022. The content of this Provisional patent application is incorporated herein in its entirety.

BACKGROUND

Light detecting and ranging (lidar) systems are used in various applications. One application for lidar systems is autonomous vehicles (AVs). AVs may use lidar systems to measure the distance from the AV to surrounding objects. To accomplish this task, the lidar system illuminates an object with light and measures the reflected light with a sensor. The reflected light is used to determine features of the object that reflected it and to determine the distance the object is from the AV. Lidar systems also may be used in other applications, such as in aircraft, ships and/or mapping systems.

SUMMARY

The present disclosure concerns implementing systems and methods for operating a lidar system. The methods comprise: arranging, by the processor, pixels in a grid (where the pixels comprise result values generated from processing waveforms produced by photodetectors of the lidar system); identifying, by the processor, a first region of interest in the grid based on correlations between range values associated with the pixels and/or correlations between intensity values associated with the pixels; combining, by the processor, result values associated with pixels located within the first region of interest to produce feature value(s); and generating, by the processor, a superpixel having value(s) set to the feature value(s).

The implementing systems can comprise: a processor; and a non-transitory computer-readable storage medium comprising programming instructions that are configured to cause the processor to implement a method for operating a lidar system. The above-described methods can also be implemented by a computer program product comprising memory and programming instructions that are configured to cause a processor to perform operations.

BRIEF DESCRIPTION OF THE DRAWINGS

The accompanying drawings are incorporated herein and form a part of the specification.

FIG. 4 provides a flow diagram of an illustrative method for spatial processing of lidar data in accordance with the present solution.

FIGS. 5A-5G (collectively referred to as "FIG. 5") provide illustrations showing another technique for combining results generated from lidar waveforms.

FIGS. 6-7 each provide an illustration showing a modified or otherwise adjusted kernel size and/or Region of Interest (ROI).

FIG. 8 provides an illustration of a ROI with an adjusted or otherwise modified position in the grid.

FIG. 9 provides a flow diagram of another illustrative method for spatial processing of lidar data in accordance with the present solution.

In the drawings, like reference numbers generally indicate identical or similar elements. Additionally, generally, the leftmost digit(s) of a reference number identifies the drawing in which the reference number first appears.

DETAILED DESCRIPTION

An AV uses sensors for situational awareness. The sensors, which may be part of a self-driving system (SDS) in the AV, may include camera(s), lidar (Light Detection and Ranging) device(s), inertial measurement unit(s) (IMU(s)) and/or the likes. The sensors are used to capture and analyze scenes around the AV. The scene analysis is performed to detect objects including static objects (such as fixed constructions) and dynamic objects (such as pedestrians and other vehicles). Data from the sensors may also be used to detect conditions such as road markings, lane curvature, traffic lights and traffic signs. Sometimes, a scene representation such as point cloud(s) obtained from the AV's lidar device(s) may be combined with image(s) from camera(s) to obtain further insights to the scene or situation around the AV.

A lidar device operating on an AV may include a transceiver apparatus including a transmitter assembly and a receiver assembly. The transmitter may transmit the light signal and the receiver may receive and process the received light signal.

Figure 1:
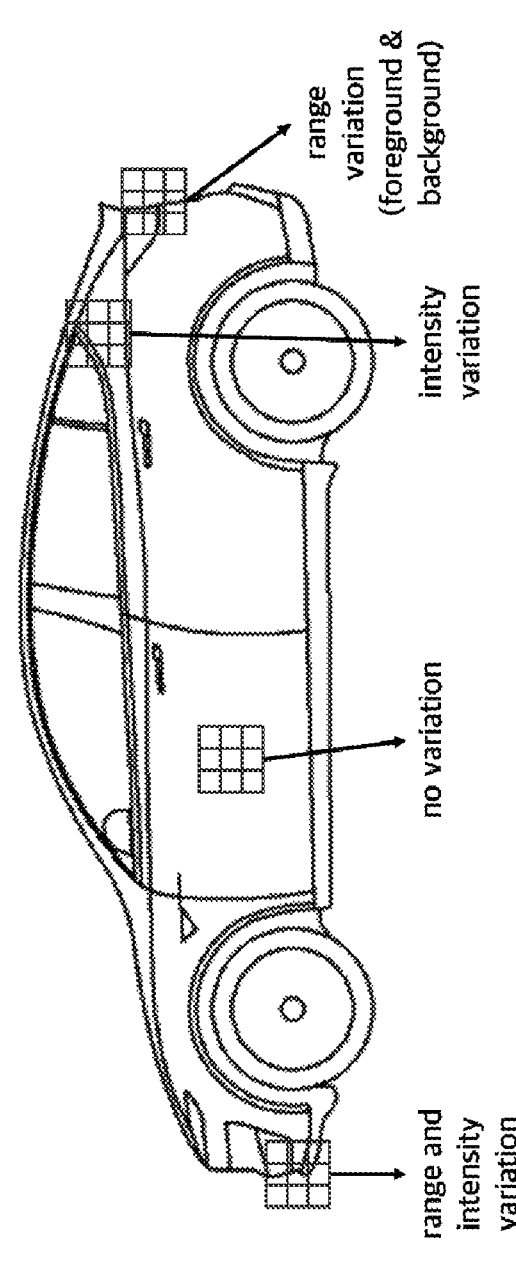
FIG. 1 is an illustration of a target object.

In some current implementations, the lidar device may use a fixed pixel size (angular resolution) with a fixed quantity of raw data integrated per point. It is desirable in some applications to use more intelligent data integration approaches which adapt to the characteristics of the target to improve detection probability and data quality (range and intensity accuracy and precision). As shown in FIG. 1, a target object (such as a vehicle) is larger than a default pixel size, but using a larger pixel size poses a risk of combining data from regions with large variations in range and intensity, which can cause blurring and other distortions in the data.

This document describes system, apparatus, device, method and/or computer program product embodiments, and/or combinations and sub-combinations of any of the above, for spatial processing of lidar data to address the detection probability and data quality issues (for example, blurring and distortion) with conventional lidar systems. The present solution addresses the above-stated issues with conventional solutions to provide improved lidar system operations, object detections using lidar data, and/or vehicle control.

Initially, a choice of input data may be considered. For example, a decision is which stage of data to use for spatial processing.

Option 1: Raw Data: Robust, high computational cost, and requires firmware modification.

Option 2: Waveforms: Robust and requires firmware modification.

Option 3: Lidar Data: Low computational cost, and can be implemented in firmware or software as a post-processing step.

Lidar data presents a good option because it has a relatively low up-front cost and can be implemented in both firmware and software.

According to some aspects, the following approaches may be implemented for each of the above options to perform spatial processing. For the above-listed Options 1-2, there are two approaches for spatial processing using the data. With regard to Option 1 concerning raw data, the first approach involves: fully processing the raw data with a fixed superpixel size to obtain a range and signal intensity for each superpixel; and reprocessing the raw data with a variable superpixel size based on range and intensity correlations with neighboring pixels. The second approach involves: calculating the total intensity for each pixel using a fixed superpixel size; and processing the raw data with a variable superpixel size based on total intensity correlations with neighboring pixels. The signal intensity has two independent fields (signal intensity and noise intensity) and one dependent field (total intensity=signal plus noise).

With regard to Option 2 concerning waveforms, the first approach involves: fully processing the waveforms with a fixed superpixel size to obtain a range and signal intensity for each superpixel; and regenerating and processing the waveforms with a variable superpixel size based on range and intensity correlations with neighboring pixels. The second approach involves: fully processing histograms with a fixed superpixel size to obtain an approximate range and signal intensity (prior to waveform analysis); and using the approximate range and intensity to integrate waveforms with a variable superpixel size based on range and intensity correlations.

With regard to Option 3 concerning lidar data, the present solution implements a novel approach. This novel approach may generally involve: aggregating neighboring pixels in the lidar data frame based on range and intensity correlations; and recalculating a new range, signal intensity, noise intensity, and confidence level based on the data fields reported for each superpixel.

More specifically, the novel approach can involve: arranging pixels in a grid (where the pixels comprise result values generated from processing waveforms produced by photodetectors of a lidar system); and identifying a region of interest (ROI) in the grid based on correlations between the pixels. The correlations can include, but are not limited to, correlations between range value associated with the pixels, and/or correlations between intensity values associated with the pixels.

In some scenarios, the ROI may be identified by: obtaining a kernel size; and using the kernel size to define the region of interest in the grid. The kernel size may be variable. The kernel size may be obtained by: locating pixels that are nearest neighbors to a POI in the grid in terms of at least a range; and defining the kernel size based on locations of the nearest neighbors in the grid. Alternatively, the kernel size may be obtained by: obtaining a reference kernel size; identifying an area in the grid using the reference kernel size; identifying a center pixel of the area; computing a score for each pixel in the area using the result values associated therewith (where the score indicates a degree of correlation between result values associated with the pixel and the center pixel); selecting pixels based on the scores; and defining the kernel size based on locations of the selected pixels in the grid. The score may be a function of range, intensity and/or noise.

The size and/or position of the ROI in the grid may optionally be adjusted to maximize a likelihood that the ROI contains a greater number of pixels associated with an object. This adjustment can be achieved by: identifying a point of interest (POI) in the ROI; identifying pixels that are nearest neighbor pixels to the POI in terms of at least a range; using centroid(s) of the nearest neighbor pixel(s) to obtain a likelihood that the POI is associated with an edge point or corner point on a surface of the object; and adjusting the size and/or position of the ROI based on the likelihood that the POI is associated with an edge point or corner point on the surface of the object. The POI may be a center pixel of the ROI.

One or more pixels in the ROI may optionally be disqualified from aggregation with other pixels in the ROI. The disqualification can be based on how far a pixel is to the POI and/or a surface in one or more dimensions. The dimensions can include, but are not limited to, a range, an intensity, a noise and a confidence. Result values associated with the remaining (or qualified) pixels located within the ROI are combined with each other to produce a feature value. A superpixel is generated that has a value set to the feature value.

The above operations of the novel approach may be iteratively repeated to generate other superpixels. The ROI used in a first iteration to produce a first superpixel can have a size and/or shape that is the same as or different than a size and/or shape of an ROI used in another iteration to produce a second superpixel. The superpixels may in some scenarios be used to control operations of an autonomous vehicle and/or other robotic device (for example, an articulating arm or electronic surgical instrument).

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Definitions for additional terms that are relevant to this document are included at the end of this Detailed Description.

Figure 2:
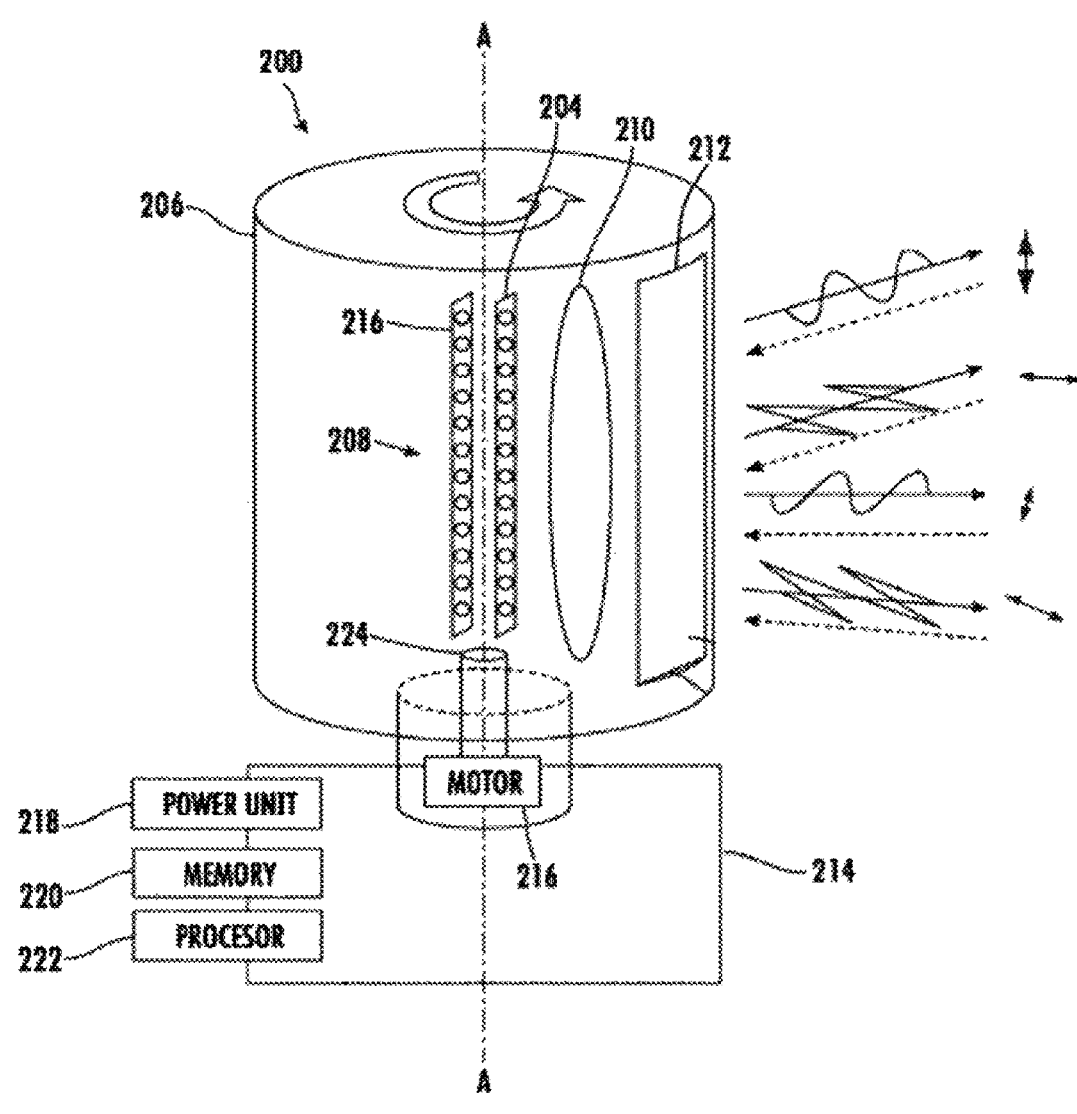
FIG. 2 is an illustration of a lidar system.

FIG. 2 illustrates an architecture for a lidar system 200, in accordance with aspects of the disclosure. Lidar system 200 is merely an example lidar system and that other lidar systems are further contemplated in accordance with aspects of the present disclosure, as should be understood by those of ordinary skill in the art.

As shown in FIG. 2, the lidar system 200 includes a housing 206 which may be rotatable 360° about a central axis such as hub or axle 224 of a motor 216. The housing 206 may include an emitter/receiver aperture 212 made of a material transparent to light. Although a single aperture is shown in FIG. 2, the present solution is not limited in this regard. In other scenarios, multiple apertures for emitting and/or receiving light may be provided. Either way, the lidar system 200 can emit light through one or more of the apertures 212 and receive reflected light back toward one or more of the apertures 212 as the housing 206 rotates around the internal components. In alternative scenarios, the outer shell of housing 206 may be a stationary dome, at least partially made of a material that is transparent to light, with rotatable components inside of the housing 206.

Inside the rotating shell or stationary dome is a light emitter system 204 that is configured and positioned to generate and emit pulses of light through the aperture 212 or through the transparent dome of the housing 206 via one or more laser emitter chips or other light emitting devices. The light emitter system 204 may include any number of individual emitters (for example, 8 emitters, 64 emitters, or 128 emitters). The emitters may emit light of substantially the same intensity or of varying intensities. The lidar system 200 also includes a light detector 208 containing an array of photodetectors 226. The photodetectors 226 are positioned and configured to receive light reflected back into the system. Upon receiving reflected light, the photodetectors 226 produce results (or electrical pulses) indicating measured intensities of the light signal reflected off an object external to the lidar system. In Geiger mode applications, the photodetectors 226 fire when a single photon at or near a target wavelength is detected thereby. The times of the photodetector firings are recorded as timestamps. The light emitter system 204 and light detector 208 rotate with the rotating shell, or they rotate inside the stationary dome of the housing 206. One or more optical element structures 210 may be positioned in front of the light emitter system 204 and/or the light detector 208 to serve as one or more lenses or wave plates that focus and direct light that is passed through the optical element structure 210.

One or more optical element structures 210 may be positioned in front of a mirror (not shown) to focus and direct light that is passed through the optical element structure. As shown in FIG. 2, a single optical element structure 210 is positioned in front of the mirror and connected to the rotating elements of the system so that the optical element structure 210 rotates with the mirror. Alternatively or additionally, the optical element structure 210 may include multiple such structures (for example, lenses and/or waveplates). Optionally, multiple optical element structures 210 may be arranged in an array on or integral with the shell portion of the housing 206.

The lidar system 200 includes a power unit 218 to power the light emitter system 204, motor 216, and electronic components. The lidar system 200 also includes an analyzer 214 with elements such as a processor 222 and non-transitory computer-readable memory 220 containing programming instructions. The programming instructions are configured to enable the system to receive data collected by the light detector 208, analyze the received data to measure characteristics of the light received, and generate information that a connected system can use to make decisions about operating in an environment from which the data was collected. Optionally, the analyzer 214 may be integral with the lidar system 200 as shown, or some or all of it may be external to the lidar system and communicatively connected to the lidar system via a wired or wireless communication network or link.

The lidar system 200 uses waveforms output from the photodetectors 226 to produce results $p_1, p_2, \ldots, p_X$. Each result $p_1, p_2, \ldots, p_X$ has values associated therewith. The values include, but are not limited to, a range value, an intensity value, a noise value, a confidence value and/or a trial value. The results may be aggregated to produce superpixels. One illustrative naive technique for generating the superpixels will be discussed below in relation to FIG. 3.

In Geiger mode lidar systems, the sensor comprises an avalanche detector or (photodiode) configured to produce an electrical pulse of a given amplitude in response to an absorption of a photon of the same or similar wavelength as the light signal which was emitted. A histography may then be assembled over many tests, and the location of an object's surface may be estimated from the peak of the histogram. The term "test", as used here, refers to each measurement attempt. A measurement attempt comprises sending a pulse and recording the detection time. The test is associated with the measurement, but not necessarily the pulse. There can be multiple tests from a single pulse by grouping the detections from multiple detectors. Each detector output is a measurement. However, the accuracy of the histogram is fundamentally limited by the width of a bin. Thus, the present solution concerns post-processing operations for updating range, intensity, noise and/or confidence values. The post-processing operations will be discussed in detail in relation to FIG. 4.

Figure 3:
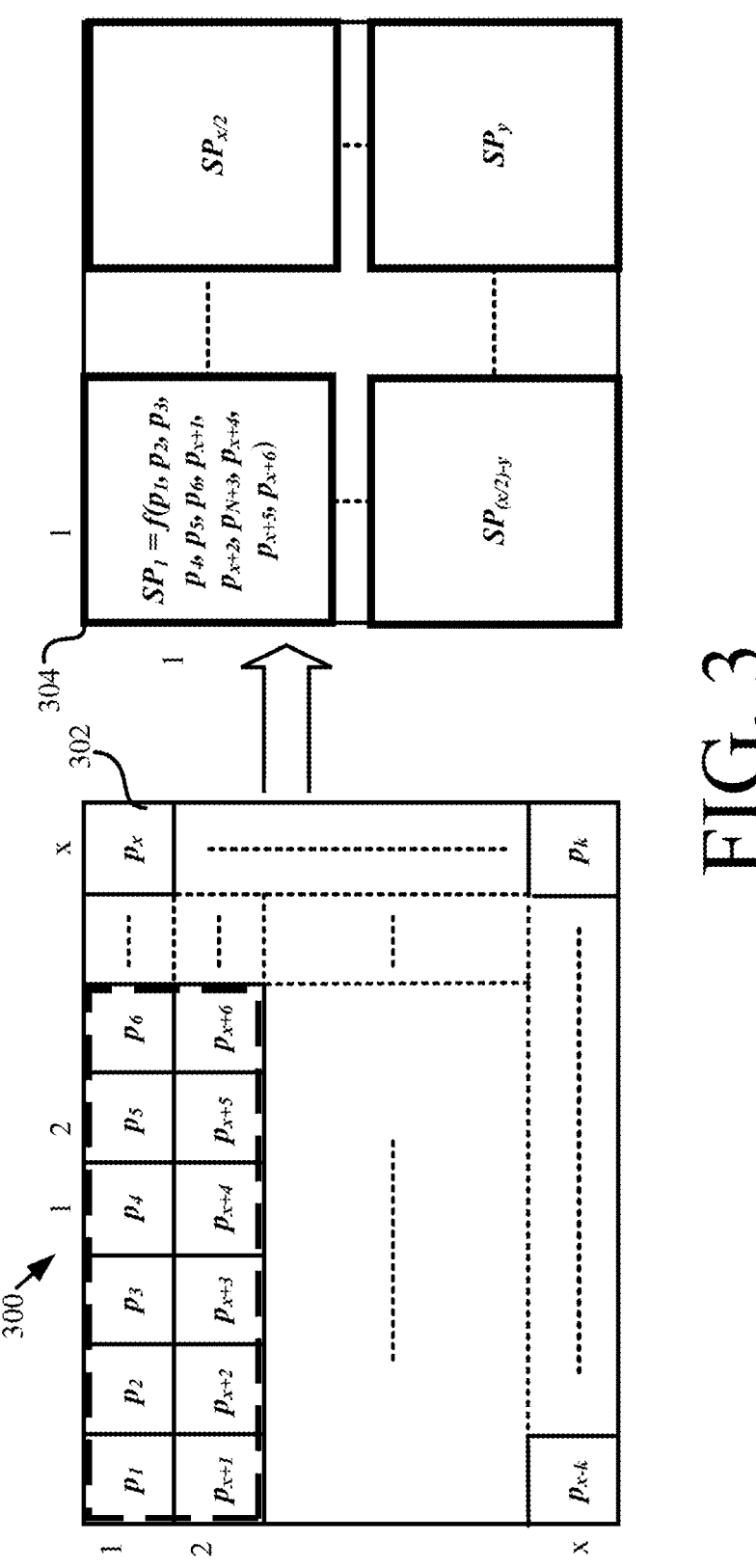
FIG. 3 is an illustration of a lidar image and superpixels generated by combining results generated from lidar waveforms.

Referring now to FIG. 3, the results $p_1, p_2, \ldots, p_x$ may be represented in grid 300 defined by a plurality of cells 302. Each result is also referred to herein as a pixel of a lidar image. The pixels $p_1, p_2, p_x$ may be naively aggregated in a super cell-by-super cell manner to produce a set of 3D points. A super cell has a size of Q×Z, where Q and Z are each an integer. In FIG. 3, each super cell is 2 cell×6 cells. The 3D point associated with each super cell 304 is derived by combining the respective six pixels with each other to obtain a superpixel $SP_1, SP_2, \ldots, SP_y$. A first superpixel $SP_1$ may be defined by the following mathematical equation (1).

$$SP_1 = f(p_1, p_2, p_3, p_4, p_5, p_6, p_{x+1}, p_{x+2}, p_{x+3}, p_{x+4}, p_{x+5}, p_{x+6}) \qquad (1)$$

Each of the other superpixels $SP_2, \ldots, SP_y$ would be defined by a similar mathematical equation as should be understood. The mechanism by which the pixels are aggregated is specific to individual lidar system designed and may vary in accordance with applications. For example, simple addition may be employed for pixel aggregation.

The approach of FIG. 3 suffers from certain drawbacks. Since this technique uses a fixed pixel size (angular resolution) with a fixed quantity of pixels integrated per superpixel, there is a risk of combining pixels from regions with large variations in range and intensity, which can cause blurring and other distortions in the resulting lidar image comprising the superpixels. The present solution addresses these drawbacks by implementing a novel approach for generating superpixels. This novel approach will now be discussed in relation to FIG. 4.

FIG. 4 provides a flow diagram of an illustrative method 400 for generating and/or using superpixels. Method 400 can be entirely or partially performed by a processor (for example, processor 222 of FIG. 2) of a lidar system (for example, lidar system 200 of FIG. 2).

Figure 5A:
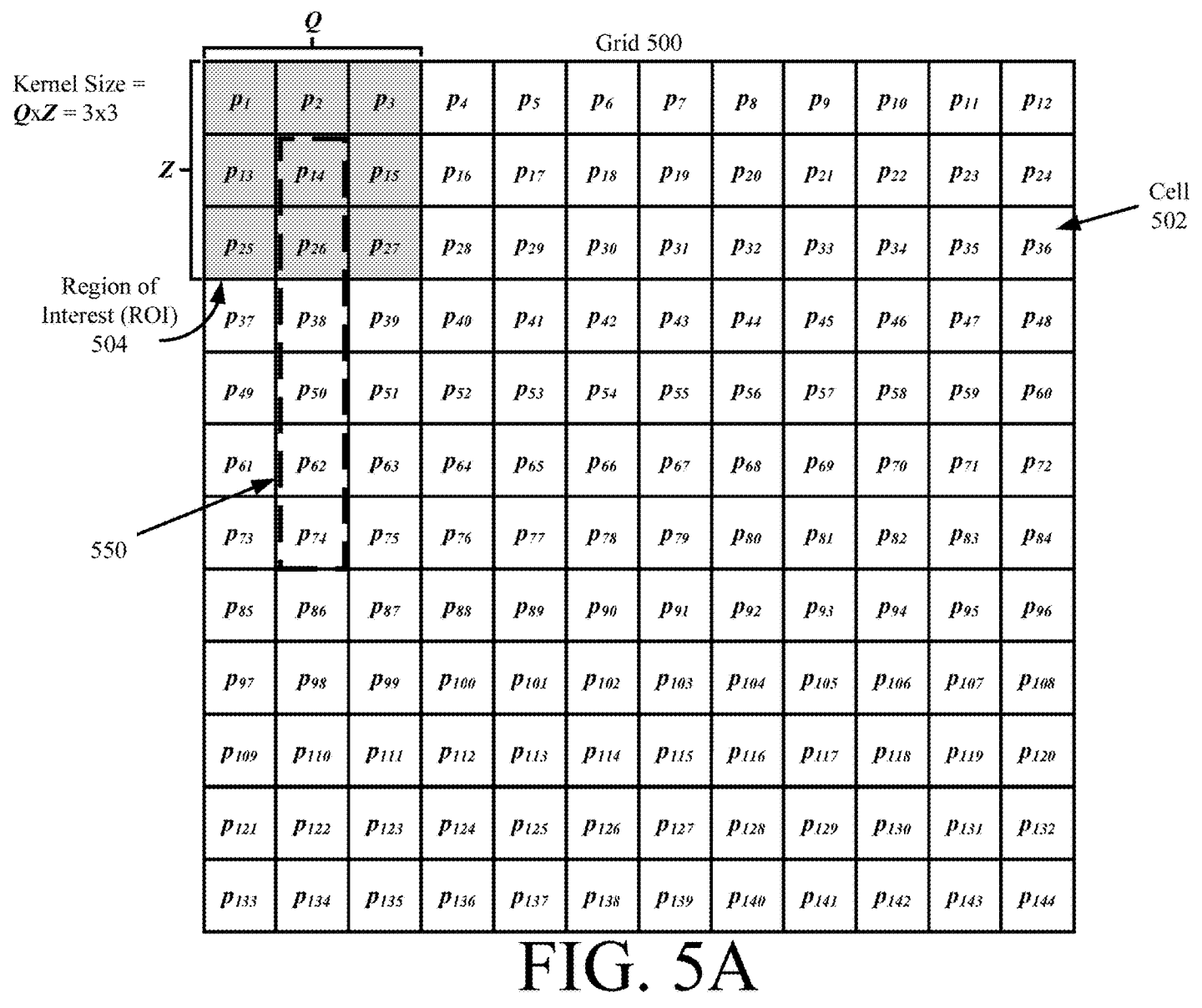

Method 400 begins with 402 and continues with 404 where a light pulse is emitted from the lidar system. The light may be reflected off of an object and back into the lidar system. The reflected light may be received by the photodetectors as shown by 406. The waveforms output from the photodetectors are then processed to generate results. Each result has values associated therewith. These values can include, but are not limited to, a range value, an intensity value, a noise value, a confidence value, a count value and a trial value. In 410, the results are arranged in a grid of cells. An illustrative grid 500 is shown in FIG. 5A with results $p_1$, $p_2$, . . . , $p_{144}$ respectively assigned to cells 502 thereof.

The grid is then used to generate superpixels in accordance with the novel approach of the present solution. This novel approach can employ at least one filter (or kernel) that runs over the grid and computes features. In the event that multiple computer kernels are employed, each computing kernel extracts a different feature from the grid.

Accordingly in 412 of FIG. 4, the processor obtains a kernel size and a stride. The kernel size may be a pre-defined fixed value or a variable value. The kernel size can be defined as Q cells by Z cells. Q and Z are both integers which may be the same as each other or different than each other. When the native angular resolution is equal in azimuth and elevation, the kernel size is selected such that Q and Z are equal to each other. For example, the kernel size is selected to be three cells by three cells (3×3) as shown in FIG. 5A, five cells by five cells (5×5) (not shown), or seven cells by seven cells (7×7) (not shown). The present solution is not limited to the particulars of this example. Even numbers for Q and Z may be used. However, odd numbers for Q and Z may be desirable in some applications because they allow for a center pixel which may be used as a POI as described below. The larger the kernel size, the better the resulting feature but higher the compute cost. The stride S may be a pre-defined fixed value or a variable value, where S is an integer (for example 1 or 6).

It may be more robust to locate the nearest neighbor pixels instead of bounding the search space using a fixed Q×Z kernel. The nearest neighbor pixels can be located in in cartesian space and/or pixel space. Pixel space is similar to spherical coordinates (range, azimuth angle, elevation angle). The nearest neighbor can be found by including points less than the range tolerance and minimizing an angle between the POI and the neighbors. Thus, in the variable kernel size and/or stride scenarios, the kernel size and/or stride may be dynamically determined or otherwise obtained based on a nearest neighbor approach. The nearest neighbor approach can involve, for example: obtaining a reference kernel size; identifying a POI using the kernel size (where the POI is the center pixel of the area defined by the kernel size); computing a score A for each pixel (for example, results $p_1$, $p_2$, . . . , $p_{144}$) using the values associated therewith; selecting a given number (for example, twelve) nearest neighbor pixels of the POI based on the scores; defining a new kernel size based on the selected nearest neighbor pixels; and/or selecting a stride based on the scores and/or the new kernel size. The scores A indicate how well pixels are correlated to each other. Each score A may be defined by the following mathematical equations (2) or (3).

$$A=f(R,I,N,C,T,K) \qquad (2)$$

$$A=f(w_1 \cdot R, w_2 \cdot I, w_3 \cdot N, w_4 \cdot C, w_5 \cdot T, w_6 \cdot K) \qquad (3)$$

where R represents range, I represents intensity, N represents noise, C represents confidence, T represent trial, K represents number of counts, and $w_1$, . . . , $w_6$ each represent a weight. The present solution is not limited to mathematical equations (2) and (3). The score A may be a function of any combination of one or more of the listed values (i.e., R, I, N, C and/or T). The present solution is not limited to this particular nearest neighbor approach. Other nearest neighbor approaches can be employed here. The resulting kernel size may have Q and Z values which are the same as each other or different from each other.

Once the kernel size and stride has been obtained, method 400 continues with 414 where an ROI is identified in the grid. An illustrative ROI 504 is shown in FIG. 5A. The ROI 504 comprises the cells within an area of the grid that is bounded by the kernel search window having the kernel size. ROI is shown as having a square shape since its length and width are the same. The present solution is not limited in this regard. The ROI can have other shapes with different lengths and widths, such as a linear shape shown by dashed line 550 of FIG. 5A.

Figure 5B:
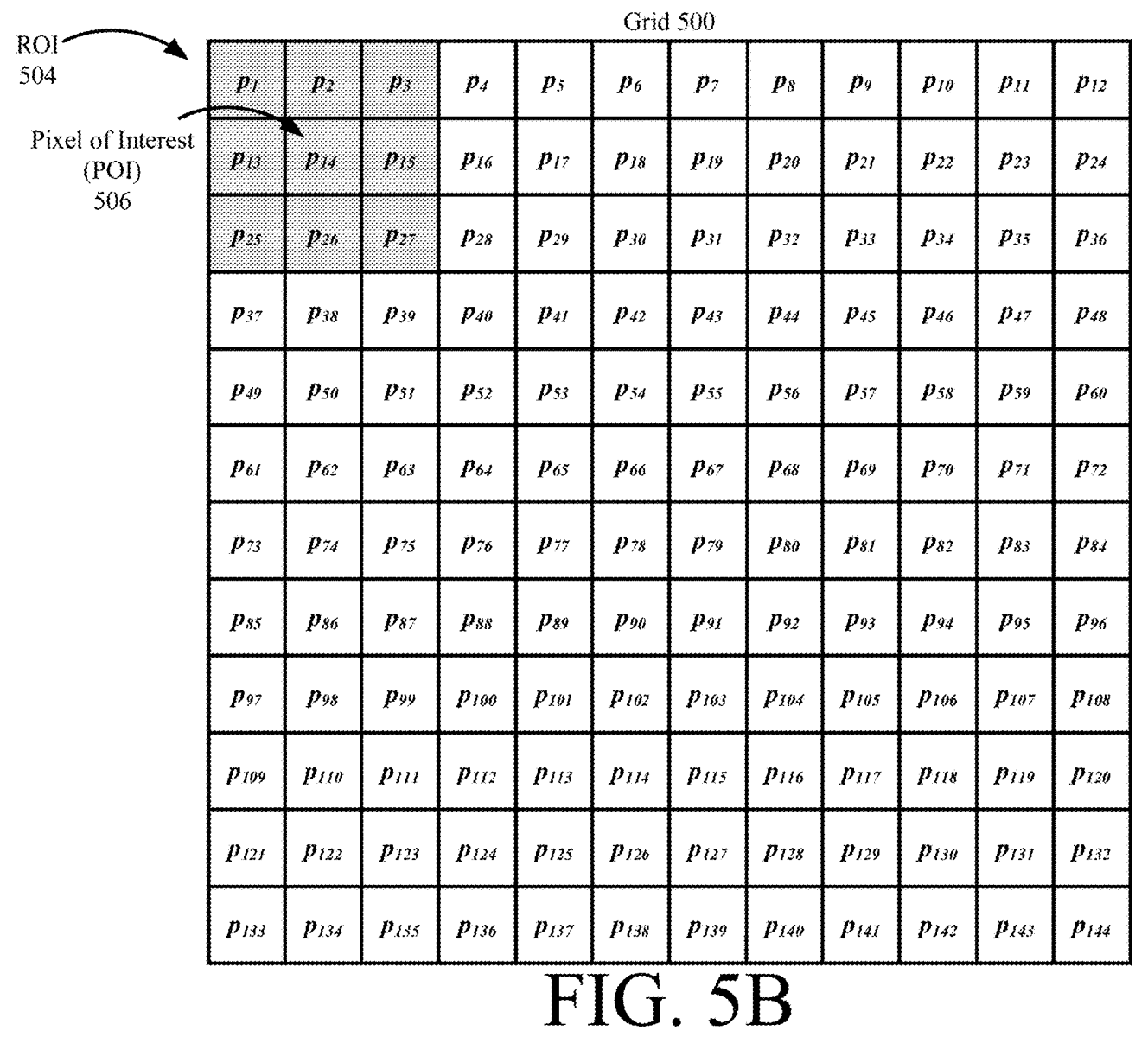

Next in 416, the POI is identified in the ROI. The POI can include, but is not limited to, the center pixel of the ROI. For example, as shown in FIG. 5B, the POI 506 comprises pixel $p_{14}$ since it is the center pixel of the ROI 504. The present solution is not limited in this regard. For example, if the center pixel confidence is above a confidence threshold, it implies a sufficient certainty or accuracy of the reported data fields and there is zero value in selecting an alternative POI. However, if the confidence of the center pixel is below a confidence threshold, there is a lower likelihood that the reported range is correct, which will cause spatial processing to fail entirely. In this case, the center pixel POI range may be replaced with a representative range from the ROI in certain circumstances. This approach first involves: finding the nearest neighbor in pixel space with a confidence greater than the confidence threshold; and replacing the range of the center pixel POI with this range. Do not modify any other POI fields. Second, the system performs spatial processing as usual; keeps track of the quadrant position of the correlated pixels included in the ROI; and keeps the final result if and only if correlated pixels exist in at least N quadrants of the ROI (most conservatively, all four quadrants). Otherwise, ignore this point and continue to the next pixel in your stride.

The size and/or position of the ROI may be optionally adjusted as shown by blocks 418-420. By shifting the position of the ROI in the grid, the system can maximize the likelihood that the kernel contains a greater number of pixels belonging to the same target object as the POI (for example, pixel p14 of FIG. 5A) or a greater number of pixels that are well correlated with the POI.

The centroid of the nearest neighbor pixels relative to the POI can indicate where on the surface of the object the POI is located. If the centroid is biased up, down, left or right relative to the POI, then the POI is likely an edge point of the object. In contrast, if the centroid is biased to a corner of the POI or ROI, then the POI is likely a corner point. This information can be used to adjust (for example, expanded/increased or contracted/decreased) the kernel size in one or more directions. For example, if the POI is considered an edge point of the object, then the kernel size and/or ROI location in the grid is/are changed so that the POI is located at the edge of the ROI instead of at the center of the ROI. If the POI is considered a corner point on the bottom left of the target object, then the kernel size and/or ROI location in the grid is/are changed so that the POI is located at a bottom left corner of the ROI instead of at the center of the ROI. Similarly, if the POI is considered a corner point on the top left of the target object, then the kernel size and/or ROI location in the grid is/are changed so that the POI is located at a top left corner of the ROI instead of at the center of the ROI. The present solution is not limited in this regard.

Figure 5C:
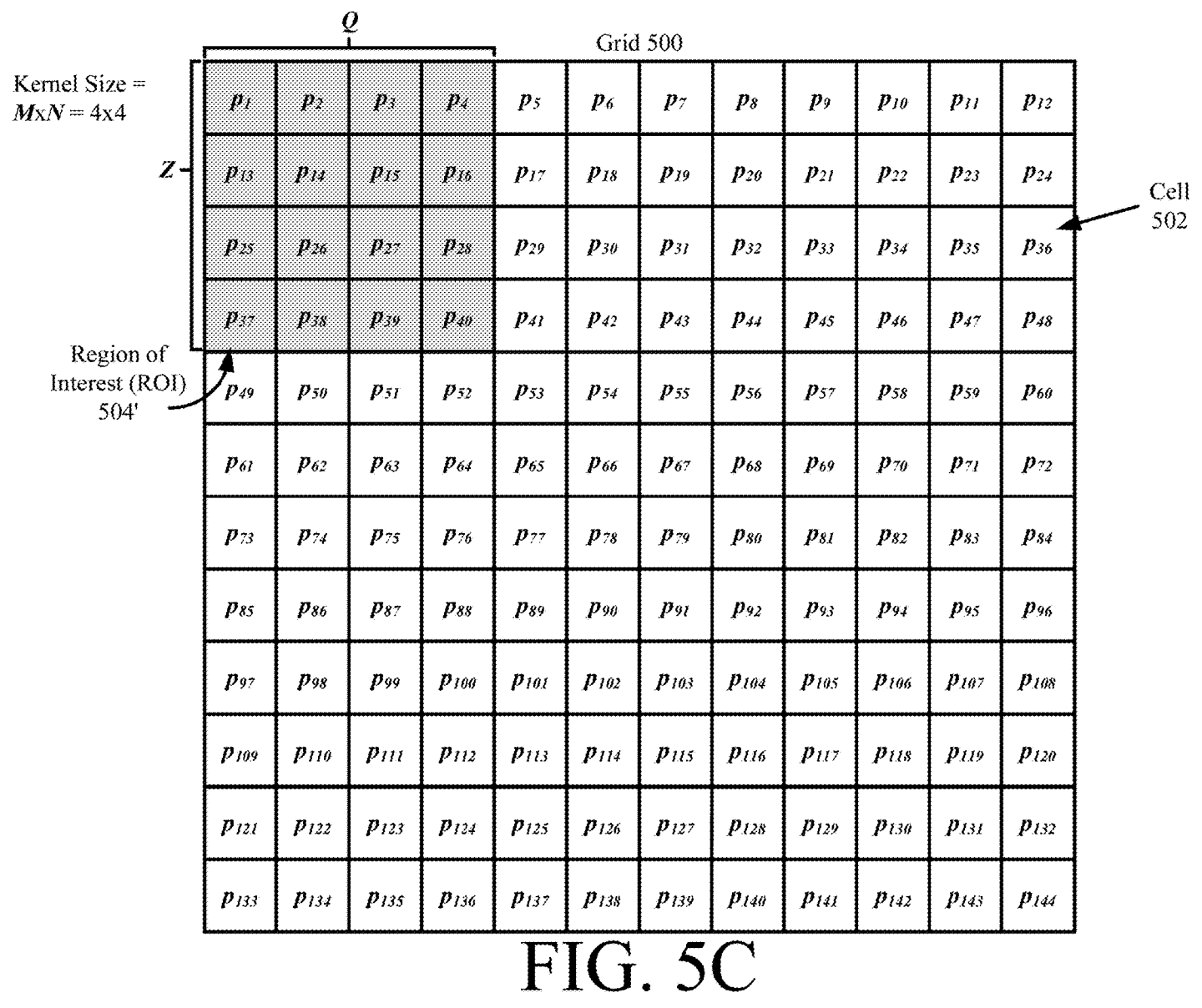
Figure 5D:
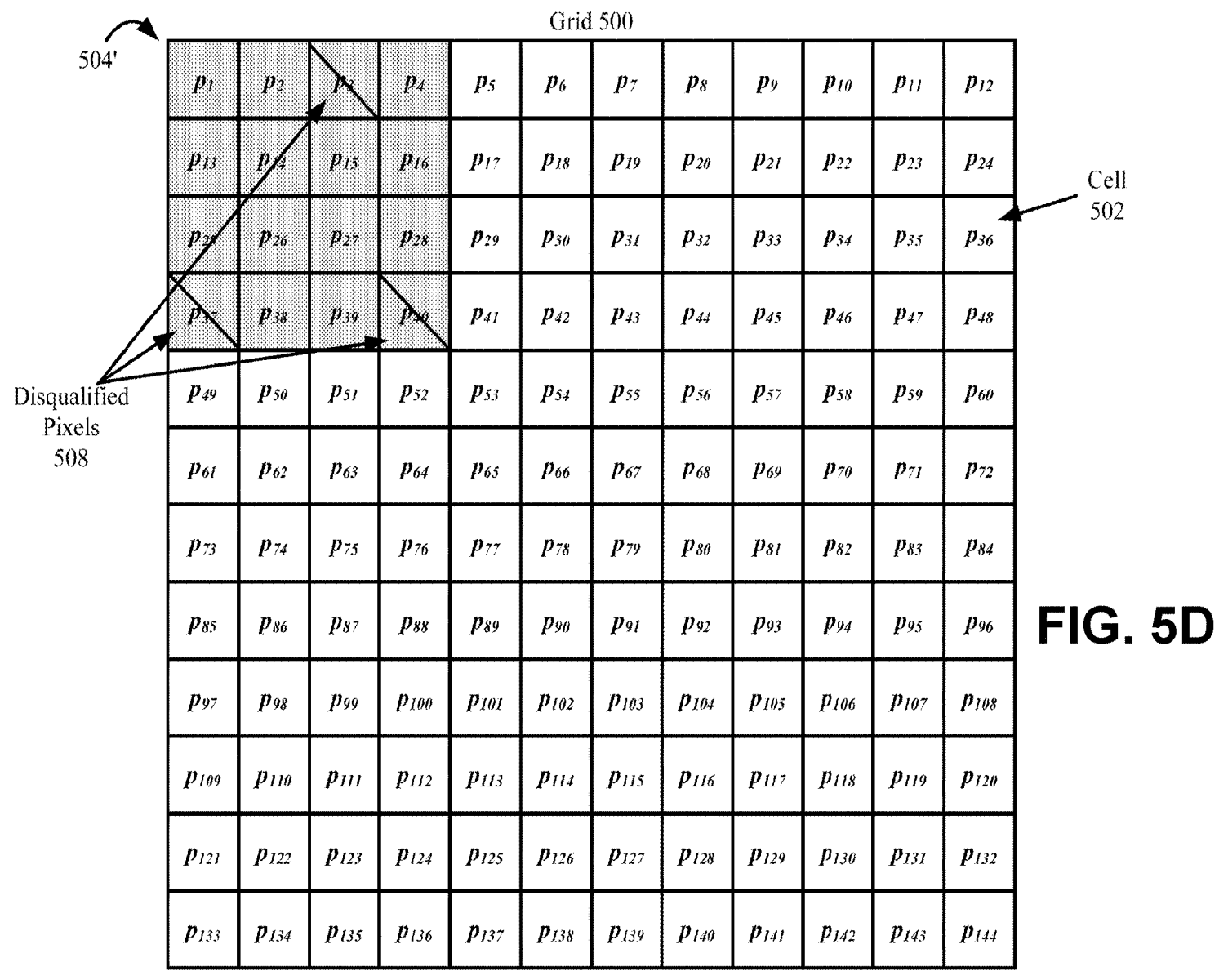
Figure 8:
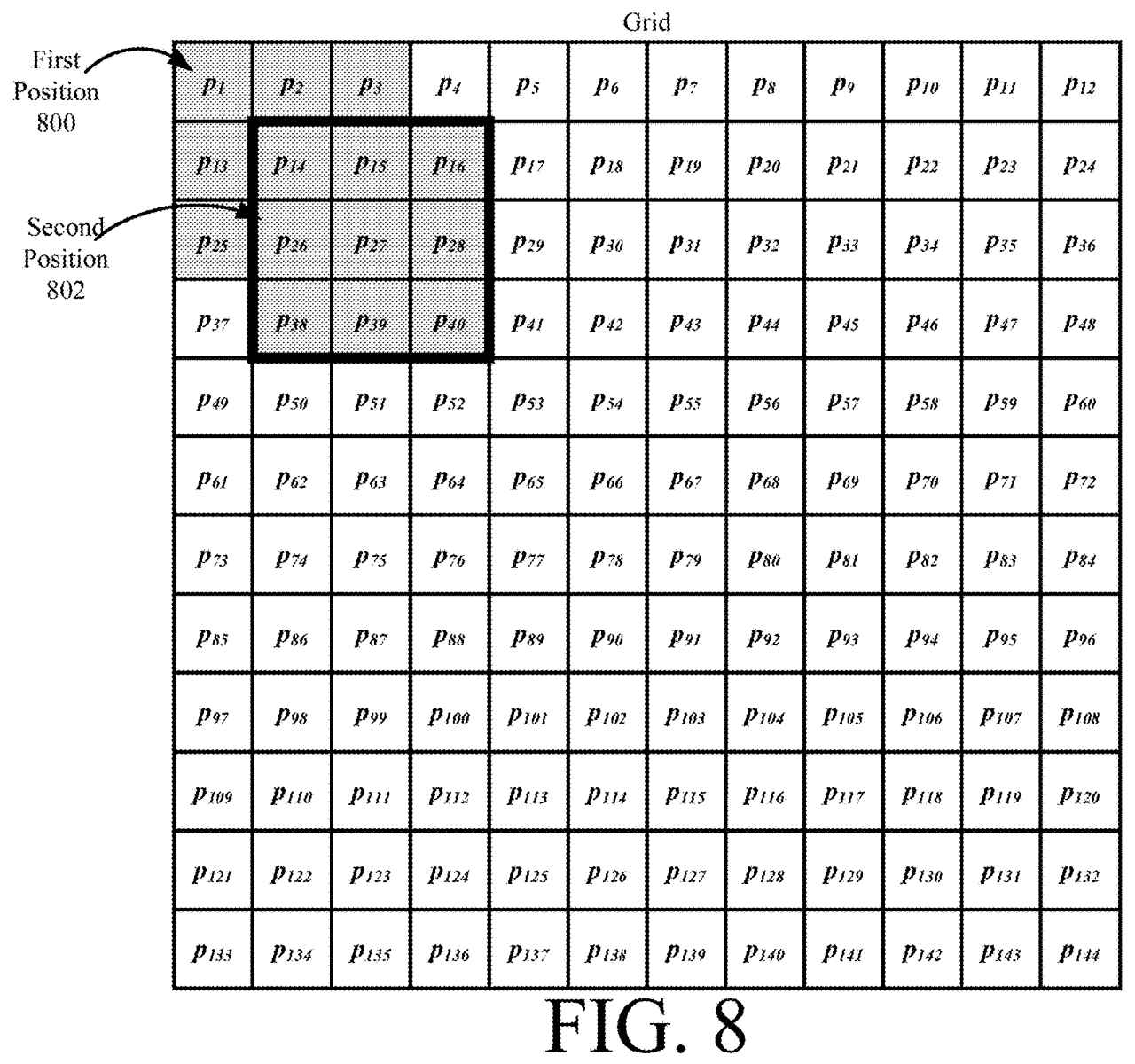

The kernel size may be adjusted to expand the ROI in both the Q and Z directions. For example, the kernel size is expanded from three cells by three cells (3×3) to four cells by four cells (4×4) as shown by FIGS. 5A and 5C. In effect, the ROI 504 is expanded in both the Q and Z direction to form ROI 504'. The present solution is not limited in this regard. The kernel size can additionally or alternatively be adjusted in only the Q direction as shown in FIG. 6 or only the Z direction as shown in FIG. 7. The position or location of the ROI in the grid may alternatively or additionally be changed. For example, as shown in FIG. 8, the 3×3 ROI is shifted from the first position 800 (i.e., one cell in the Q direction and one cell in the Z direction) to the second position 802. The present solution is not limited in this regard. The position of the ROI can be shifted in one or both directions by any number of cells selected in accordance with a given application.

Referring back to FIG. 4, method 400 continues with 422 where a range tolerance, an intensity tolerance, a noise tolerance and/or a confidence threshold is/are obtained from a datastore. These values may be pre-configured values. One or more pixels in the ROI may be disqualified from aggregation in 424 based on the range tolerance, intensity tolerance, noise tolerance and/or confidence threshold. The tolerances are used to exclude points from aggregation that are too far from the POI in one or more dimensions. For example, if a range value of the POI is 10 and the range tolerance is ±1, then the system determines whether the range value of another pixel in the ROI is between 9 and 11. If so, then the another pixel is qualified for aggregation. Otherwise, the pixel is disqualified from aggregation. The present solution is not limited to the particulars of this example. If the lidar system reports multiple returns per pixel, all returns in all pixels of the ROI must be checked for (dis)qualification or (un)suitability for aggregation.

In some scenarios, a pixel may be considered a qualified pixel when (i) its associated range, intensity and/or noise value(s) fall within the tolerance(s) and/or (ii) its associated confidence value is equal to or greater than the confidence threshold. A pixel may be considered a disqualified pixel when (i) its associated range, intensity and/or noise value(s) fall outside of the tolerance(s) and/or (ii) its associated confidence value is less than the confidence threshold. For example, as shown in 5D, pixels $p_3$, $p_{37}$ and $p_{40}$ of ROI 504' are considered disqualified (or unsuitable) pixels 508 for aggregation. The present solution is not limited in this regard.

In other scenarios, the surface normal may be estimated and the range tolerance is applied relative to the surface instead of relative to the POI. For example, if a pixel is looking at the road, the surface normal will be pointing upward. Pixels inside the integration window can be included if the range is close enough to the road surface, instead of if the range is close enough to the POI. Additionally or alternatively, neighbor pixels may be included in the set of qualified pixels when there is overlap in the signal intensity confidence interval. Geiger mode lidar intensity is noisy, but a confidence interval can be calculated using binomial statistics given a number of counts and a number of trials in the span containing return signals. Neighbor pixels may alternatively or additionally be included in the set of qualified pixels when there is an overlap in the noise intensity confidence interval. In this case, the noise intensity confidence interval is a function of the number of noise counts and noise trials, which can be derived from the total counts and trials minus the number of counts and trials in the span(s) containing the return signal(s).

Figure 5E:
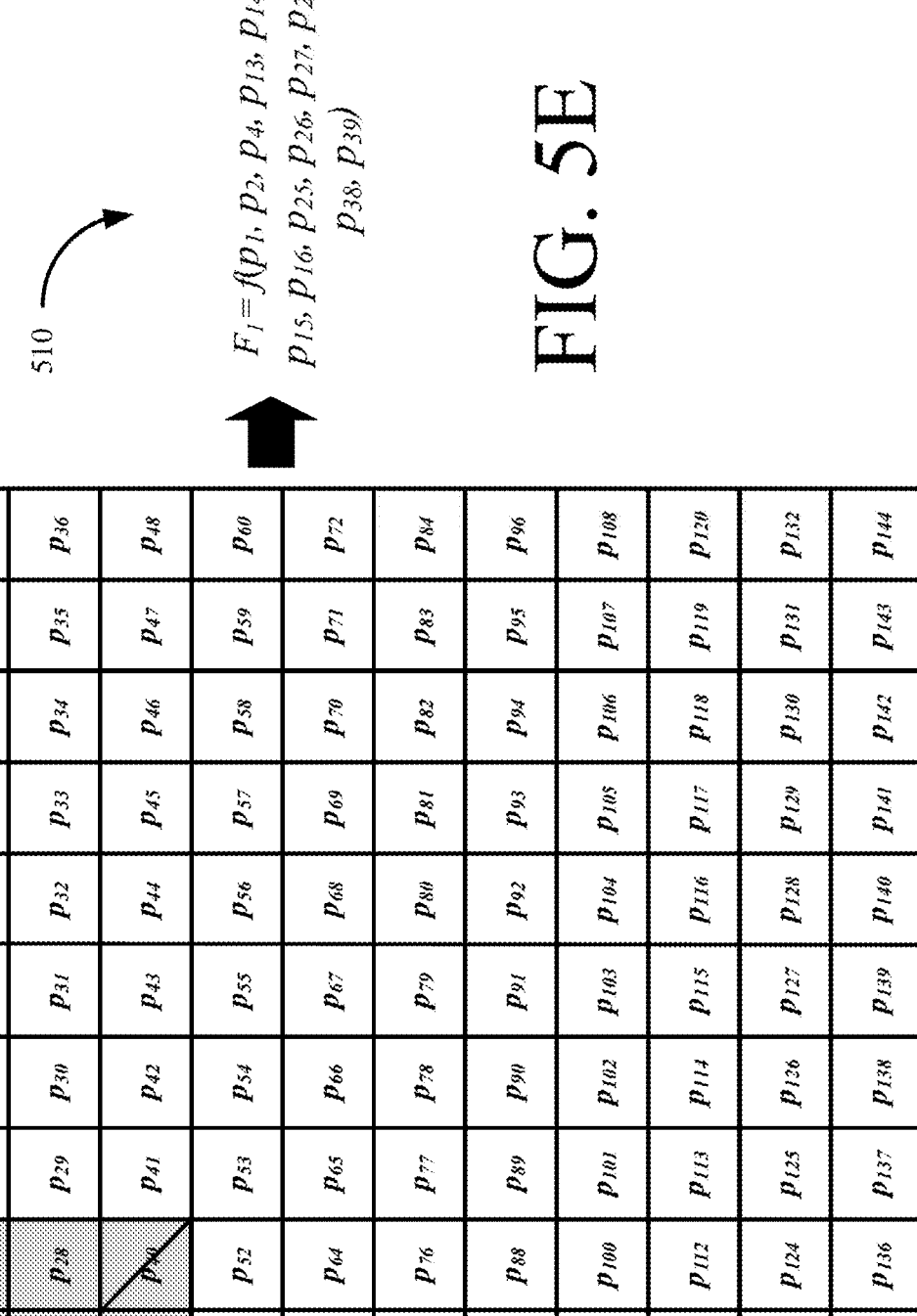

Upon completing 424, method continues with 426 where the remaining pixels in the ROI 504' are combined by the kernel to produce a superpixel. For example, as shown in FIG. 5E, the kernel 510 applies a function to the remaining pixels $p_1$, $p_2$, $p_4$, $p_{13}$, $p_{14}$, $p_{15}$, $p_{16}$, $p_{25}$, $p_{26}$, $p_{27}$, $p_{28}$, $p_{38}$, $p_{39}$ to obtain a feature $F_1$. Feature $F_1$ can be defined by the following mathematical equation (4).

$$F_1 = f(p_1, p_2, p_4, p_{13}, p_{14}, p_{15}, p_{16}, p_{25}, p_{26}, p_{27}, p_{28}, p_{38}, p_{39}) \quad (4)$$

The feature $F_1$ is considered a superpixel (i.e., $SP_1 = F_1$). The feature (or superpixel) can include, but is not limited to, a range, an intensity, a noise, and/or a confidence. The mechanism by which the pixels are aggregated is specific to individual lidar system designed and may vary in accordance with applications. For example, simple addition or averaging may be employed for pixel aggregation. In this regard, the range value of the feature $F_1$ may include, but is not limited to, a mean range of the remaining pixels within the ROI. The intensity value of the feature $F_1$ may include, but is not limited to: an intensity value derived from a sum of signal counts and trials of the remaining pixels within the ROI; or a mean intensity of the remaining qualified pixels within the ROI (when counts and trials are not available). The noise value of the feature $F_1$ can include, but is not limited to: a noise value derived from a sum of noise counts and trials of the remaining pixels within the ROI; or a mean noise of the remaining pixels within the ROI. The confidence value of the feature $F_1$ can include, but is not limited to, a confidence value derived from an updated noise value and a sum of signal counts and trials in the kernel.

Figure 5F:
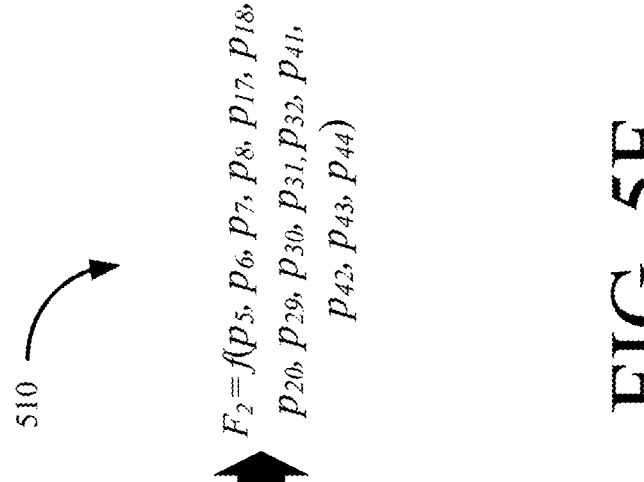

The process of 412-426 is repeated to produce other superpixels based on the stride. For example, the next ROI is identified by shifting the kernel search window in accordance with the stride and generating a next superpixel in accordance with the above described process. For example, as shown in FIG. 5F, the stride is 4 so the kernel search window is shifted four cells to the right. Consequently, the next superpixel is set to the feature $F_2$ which is defined by the following mathematical equation (5).

$$F_2 = f(p_5, p_6, p_7, p_8, p_{17}, p_{18}, p_{20}, p_{29}, p_{30}, p_{31}, p_{32}, p_{41}, p_{42}, p_{43}, p_{44}) \quad (5)$$

Other features $F_3, \ldots, F_{12}$ are generated in a similar manner. The features define a feature map 512 as shown in FIG. 5G. The other superpixels are respectively set to these features (i.e., $SP_2 = F_2$, $SP_3 = F_3$, ..., $SP_{12} = F_{12}$). The superpixels may then be used to control operations of a vehicle and/or dispatch personnel to the field, as shown by optional 430. Subsequently, 432 is performed where method 400 ends or other operations are performed.

The above-described method 400 provides several advantageous over existing systems and methods. For example, the implementing systems and method 400 provide for: (i) improved range accuracy and precision; (ii) improved range and intensity precision; (iii) improved detectability and quality of paint lines (for example, lane marks on roads); (iv) elimination of high intensity artifacts and increased effective dynamic range; (v) improved probability of detection of black or dark targets; and (vi) increased detection of probability of targets at longer ranges. With regard to item (v), it should be noted that the result (or pixel) data can be corrupted (for example, contain incorrect range values and/or a relatively low confidence value that falls below a threshold) which prevents detection of the dark object. In the low confidence value scenario, the present solution can result in an increase in the confidence value such that it now exceeds the threshold value, whereby the dark object can be detected with an improved degree of confidence.

Method 400 can be implemented at a Geiger-mode Avalanche Photodiode (GmAPD) data level as a form of intelligent oversampling in the detection and waveform analysis steps. Method 400 may also be implemented at the signal detection stage by: using a two pass process where data from a first detection attempt is feedback into a second detection attempt; or using priors calculated from the raw data prior to histogramming to determine which pixels to integrate into a single histogram. In the latter case, a total flux may be computed for each GmAPD pixel because it combines range, signal intensity and noise.

Referring now to FIG. 9, there is provided a flow diagram of another method 900 for operating a lidar system. Method 900 can be entirely or partially performed by a processor (for example, processor 222 of FIG. 2) of a lidar system (for example, lidar system 200 of FIG. 2).

Method 900 begins with 902 and continues with 904 where pixels (for example, pixels $p_1, \ldots, p_{144}$ of FIG. 5) are arranged in a grid (for example, grid 500 of FIG. 5). The pixels comprise result values generated from processing waveforms produced by photodetectors (for example, photodetectors 226 of FIG. 2) of the lidar system. In 906, the processor performs operations to identify an ROI in the grid based on correlations between the pixels. The correlations can include, but are not limited to, correlations between range value associated with the pixels, and/or correlations between intensity values associated with the pixels.

In some scenarios, the ROI may be identified by: obtaining a kernel size; and using the kernel size to define the region of interest in the grid. The kernel size may be variable. The kernel size may be obtained by: locating ones of the pixels that are nearest neighbors to a POI in the grid in terms of at least range; and defining the kernel size based on locations of the nearest neighbors in the grid. Alternatively, the kernel size may be obtained by: obtaining a reference kernel size; identifying an area in the grid using the reference kernel size; identifying a center pixel of the area; computing a score for each said pixel in the area using the result values associated therewith, the score (for example, score A mentioned above) indicating a degree of correlation between result values associated with the pixel and the center pixel; selecting pixels based on the scores; and defining the kernel size based on locations of the selected pixels in the grid. The score may be a function of range, intensity and/or noise.

In 908, the size and/or position of the ROI in the grid is optionally adjusted to maximize a likelihood that the ROI contains a greater number of pixels associated with an object. This adjustment can be achieved by: identifying a POI in the ROI; identifying pixels that are nearest neighbor pixels to the POI in terms of at least range; using centroid(s) of the nearest neighbor pixel(s) to obtain a likelihood that the POI is associated with an edge point or a corner point on a surface of the object; and adjusting the size and/or position of the ROI based on the likelihood that the POI is associated with an edge point or a corner point on the surface of the object. The POI may be a center pixel of the ROI.

In 910, one or more pixels in the ROI may optionally be disqualified from aggregation with other pixels in the ROI. The disqualification can be based on how far a pixel is to the POI and/or a road surface in one or more dimensions. The dimensions can include, but are not limited to, a range, an intensity, a noise and a confidence.

In 912, the processor combines result values associated with pixels located within the ROI to produce a feature value (for example, feature value $F_1$ of FIG. 5G). A superpixel is generated in 914 that has a value set to the feature value. The operations of blocks 906-914 may be iteratively repeated to generate other superpixels, as shown by block 916. The ROI used in a first iteration to produce a first superpixel can have a size and/or shape that is different than a size and/or shape of an ROI is used in another iteration to produce a second superpixel. Subsequently, 918 is performed where method 900 ends or other operations are performed (for example, return to 902).

The above described lidar system can be used in various applications. The present solution will now be described in the context of autonomous vehicles. However, the present solution is not limited to autonomous vehicle applications. The present solution can be used in other applications such as robotic applications (for example to control movements of articulating arms) and/or system performance applications.

Figure 10:
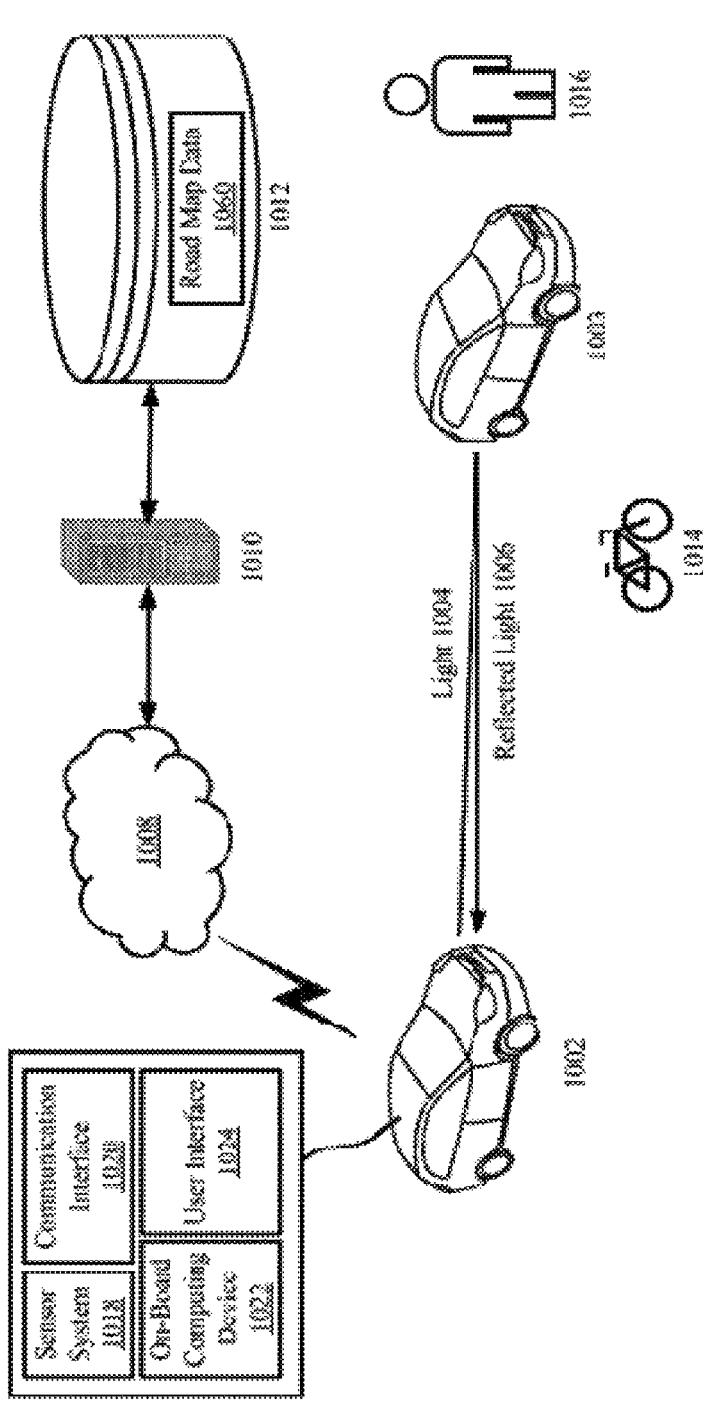
FIG. 10 provides an illustration of a system.

FIG. 10 illustrates an example system 1000, in accordance with aspects of the disclosure. System 1000 comprises a vehicle 1002 that is traveling along a road in a semi-autonomous or autonomous manner. Vehicle 1002 is also referred to in this document as AV 1002. AV 1002 can include, but is not limited to, a land vehicle (as shown in FIG. 10), an aircraft, or a watercraft. As noted above, except where specifically noted this disclosure is not necessarily limited to AV embodiments, and it may include non-autonomous vehicles in some embodiments.

AV 1002 is generally configured to detect objects in its proximity. The objects can include, but are not limited to, a vehicle 1003, cyclist 1014 (such as a rider of a bicycle, electric scooter, motorcycle, or the like) and/or a pedestrian 1016.

As illustrated in FIG. 10, the AV 1002 may include a sensor system 1018, an on-board computing device 1022, a communications interface 1020, and a user interface 1024. Autonomous vehicle system may further include certain components (as illustrated, for example, in FIG. 11) included in vehicles, which may be controlled by the on-board computing device 1022 using a variety of communication signals and/or commands, such as, for example, acceleration signals or commands, deceleration signals or commands, steering signals or commands, braking signals or commands, etc.

The sensor system 1018 may include one or more sensors that are coupled to and/or are included within the AV 1002. For example, such sensors may include, without limitation, a lidar system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 1002, information about the environment itself, information about the motion of the AV 1002, information about a route of the vehicle, or the like. As AV 1002 travels over a surface, at least some of the sensors may collect data pertaining to the surface.

The AV 1002 may also communicate sensor data collected by the sensor system to a remote computing device 1010 (for example, a cloud processing system) over communications network 1008. Remote computing device 1010 may be configured with one or more servers to perform one or more processes of the technology described in this document. Remote computing device 1010 may also be configured to communicate data/instructions to/from AV 1002 over network 1008, to/from server(s) and/or datastore(s) 1012. Datastore(s) 1012 may include, but are not limited to, database(s).

Network 1008 may include one or more wired or wireless networks. For example, the network 1008 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 1002 may retrieve, receive, display, and edit information generated from a local application or delivered via network 1008 from datastore 1012. Datastore 1012 may be configured to store and supply raw data, indexed data, structured data, road map data 1060, program instructions or other configurations as is known.

The communications interface 1020 may be configured to allow communication between AV 1002 and external systems, such as, for example, external devices, sensors, other vehicles, servers, data stores, databases, etc. The communications interface 1020 may utilize any now or hereafter known protocols, protection schemes, encodings, formats, packaging, etc. such as, without limitation, Wi-Fi, an infrared link, Bluetooth, etc. The user interface system 1024 may be part of peripheral devices implemented within the AV 1002 including, for example, a keyboard, a touch screen display device, a microphone, and a speaker, etc. The vehicle also may receive state information, descriptive information or other information about devices or objects in its environment via the communication interface 1020 over communication links such as those known as vehicle-to-vehicle, vehicle-to-object or other V2X communication links. The term "V2X" refers to a communication between a vehicle and any object that the vehicle may encounter or affect in its environment.

Figure 11:
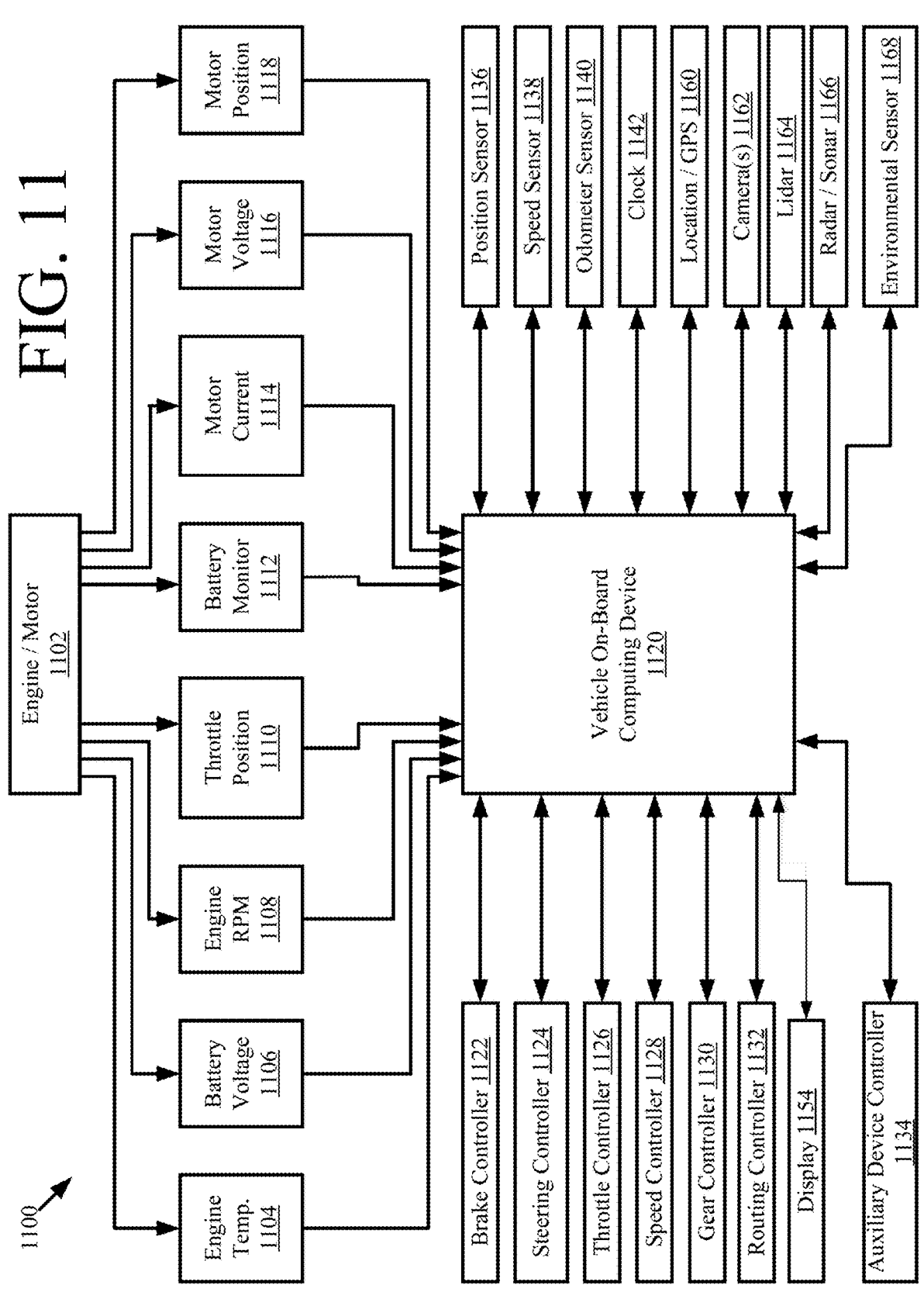
FIG. 11 provides a more detailed illustration of an autonomous vehicle.

FIG. 11 illustrates an example system architecture 1100 for a vehicle, in accordance with aspects of the disclosure. Vehicles 1002 and/or 1003 of FIG. 10 can have the same or similar system architecture as that shown in FIG. 11. Thus, the following discussion of system architecture 1100 is sufficient for understanding vehicle(s) 1002, 1003 of FIG. 10. However, other types of vehicles are considered within the scope of the technology described in this document and may contain more or less elements as described in association with FIG. 11. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 11, system architecture 1100 for a vehicle includes an engine or motor 1102 and various sensors 1104-1118 for measuring various parameters of the vehicle. In gas-powered or hybrid vehicles having a fuel-powered engine, the sensors may include, for example, an engine temperature sensor 1104, a battery voltage sensor 1106, an engine revolutions per minute (RPM) sensor 1108, and a throttle position sensor 1110. If the vehicle is an electric or hybrid vehicle, then the vehicle may have an electric motor, and accordingly includes sensors such as a battery monitoring system 1112 (to measure current, voltage and/or temperature of the battery), motor current 1114 and voltage 1116 sensors, and motor position sensors 1118 such as resolvers and encoders.

Operational parameter sensors that are common to both types of vehicles include, for example: a position sensor 1136 such as an accelerometer, gyroscope and/or inertial measurement unit; a speed sensor 1138; and an odometer sensor 1140. The vehicle also may have a clock 1142 that the system uses to determine vehicle time during operation. The clock 1142 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 1160 (such as a Global Positioning System (GPS) device); object detection sensors such as one or more cameras 1162; a lidar system 1164; and/or a radar and/or a sonar system 1166. The sensors also may include environmental sensors 1168 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 1120. The vehicle on-board computing device 1120 may be implemented using the computer system of FIG. 13. The vehicle on-board computing device 1120 analyzes the data captured by the sensors and optionally controls operations of the vehicle based on results of the analysis. For example, the vehicle on-board computing device 1120 may control: braking via a brake controller 1122; direction via a steering controller 1124; speed and acceleration via a throttle controller 1126 (in a gas-powered vehicle) or a motor speed controller 1128 (such as a current level controller in an electric vehicle); a differential gear controller 1130 (in vehicles with transmissions); and/or other controllers. Auxiliary device controller 1134 may be configured to control one or more auxiliary devices, such as testing systems, auxiliary sensors, mobile devices transported by the vehicle, etc.

Geographic location information may be communicated from the location sensor 1160 to the vehicle on-board computing device 1120, which may then access a map of the environment that corresponds to the location information to determine known fixed features of the environment such as streets, buildings, stop signs and/or stop/go signals. Captured images from the cameras 1162 and/or object detection information captured from sensors such as lidar system 1164 is communicated from those sensors) to the vehicle on-board computing device 1120. The object detection information and/or captured images are processed by the vehicle on-board computing device 1120 to detect objects in proximity to the vehicle. Any known or to be known technique for making an object detection based on sensor data and/or captured images can be used in the embodiments disclosed in this document.

Lidar information is communicated from lidar system 1164 to the vehicle on-board computing device 1120. Additionally, captured images are communicated from the camera(s) 1162 to the vehicle on-board computing device 1120. The lidar information and/or captured images are processed by the vehicle on-board computing device 1120 to detect objects in proximity to the vehicle. The manner in which the object detections are made by the vehicle on-board computing device 1120 includes such capabilities detailed in this disclosure.

In addition, the system architecture 1100 may include an onboard display device 1154 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 1120 may include and/or may be in communication with a routing controller 1132 that generates a navigation route from a start position to a destination position for an autonomous vehicle. The routing controller 1132 may access a map data store to identify possible routes and road segments that a vehicle can travel on to get from the start position to the destination position. The routing controller 1132 may score the possible routes and identify a preferred route to reach the destination. For example, the routing controller 1132 may generate a navigation route that minimizes Euclidean distance traveled or other cost function during the route, and may further access the traffic information and/or estimates that can affect an amount of time it will take to travel on a particular route. Depending on implementation, the routing controller 1132 may generate one or more routes using various routing methods, such as Dijkstra's algorithm, Bellman-Ford algorithm, or other algorithms. The routing controller 1132 may also use the traffic information to generate a navigation route that reflects expected conditions of the route (for example, current day of the week or current time of day, etc.), such that a route generated for travel during rush-hour may differ from a route generated for travel late at night. The routing controller 1132 may also generate more than one navigation route to a destination and send more than one of these navigation routes to a user for selection by the user from among various possible routes.

In various embodiments, the vehicle on-board computing device 1120 may determine perception information of the surrounding environment of the AV. Based on the sensor data provided by one or more sensors and location information that is obtained, the vehicle on-board computing device 1120 may determine perception information of the surrounding environment of the AV. The perception information may represent what an ordinary driver would perceive in the surrounding environment of a vehicle. The perception data may include information relating to one or more objects in the environment of the AV. For example, the vehicle on-board computing device 1120 may process sensor data (for example, lidar or radar data, camera images, etc.) in order to identify objects and/or features in the environment of AV. The objects may include traffic signals, roadway boundaries, other vehicles, pedestrians, and/or obstacles, etc. The vehicle on-board computing device 1120 may use any now or hereafter known object recognition algorithms, video tracking algorithms, and computer vision algorithms (for example, track objects frame-to-frame iteratively over a number of time periods) to determine the perception.

In some embodiments, the vehicle on-board computing device 1120 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The vehicle on-board computing device 1120 may perform one or more prediction and/or forecasting operations. For example, the vehicle on-board computing device 1120 may predict future locations, trajectories, and/or actions of one or more objects. For example, the vehicle on-board computing device 1120 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the AV, the surrounding environment, and/or their relationship(s). For example, if an object is a vehicle and the current driving environment includes an intersection, the vehicle on-board computing device 1120 may predict whether the object will likely move straight forward or make a turn. If the perception data indicates that the intersection has no traffic light, the vehicle on-board computing device 1120 may also predict whether the vehicle may have to fully stop prior to entering the intersection.

In various embodiments, the vehicle on-board computing device 1120 may determine a motion plan for the autonomous vehicle. For example, the vehicle on-board computing device 1120 may determine a motion plan for the autonomous vehicle based on the perception data and/or the prediction data. Specifically, given predictions about the future locations of proximate objects and other perception data, the vehicle on-board computing device 1120 can determine a motion plan for the AV that best navigates the autonomous vehicle relative to the objects at their future locations.

In some embodiments, the vehicle on-board computing device 1120 may receive predictions and make a decision regarding how to handle objects and/or actors in the environment of the AV. For example, for a particular actor (for example, a vehicle with a given speed, direction, turning angle, etc.), the vehicle on-board computing device 1120 decides whether to overtake, yield, stop, and/or pass based on, for example, traffic conditions, map data, state of the autonomous vehicle, etc. Furthermore, the vehicle on-board computing device 1120 also plans a path for the AV to travel on a given route, as well as driving parameters (for example, distance, speed, and/or turning angle). That is, for a given object, the vehicle on-board computing device 1120 decides what to do with the object and determines how to do it. For example, for a given object, the vehicle on-board computing device 1120 may decide to pass the object and may determine whether to pass on the left side or right side of the object (including motion parameters such as speed). The vehicle on-board computing device 1120 may also assess the risk of a collision between a detected object and the AV. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (for example, N milliseconds). If the collision can be avoided, then the vehicle on-board computing device 1120 may execute one or more control instructions to perform a cautious maneuver (for example, mildly slow down, accelerate, change lane, or swerve). In contrast, if the collision cannot be avoided, then the vehicle on-board computing device 1120 may execute one or more control instructions for execution of an emergency maneuver (for example, brake and/or change direction of travel).

As discussed above, planning and control data regarding the movement of the autonomous vehicle is generated for execution. The vehicle on-board computing device 1120 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 12:
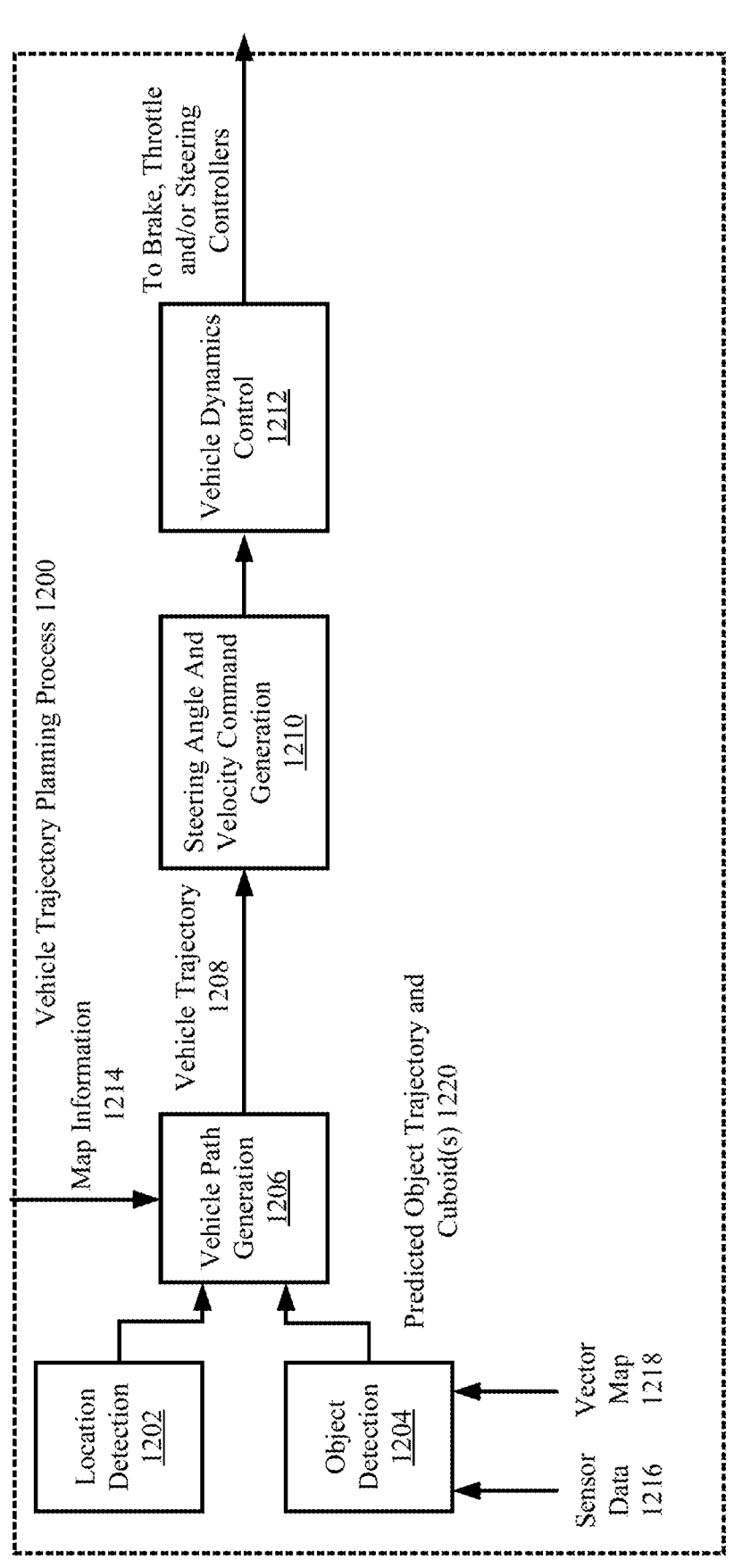
FIG. 12 provides a block diagram of an illustrative vehicle trajectory planning process.

FIG. 12 provides a block diagram that is useful for understanding how motion or movement of an AV is achieved in accordance with the present solution. All of the operations performed in blocks 1202-1212 can be performed by the on-board computing device (for example, on-board computing device 1022 of FIGS. 10 and/or 1120 of FIG. 11) of a vehicle (for example, AV 1002 of FIG. 10).

In block 1202, a location of the AV (for example, AV 1002 of FIG. 10) is detected. This detection can be made based on sensor data output from a location sensor (for example, location sensor 1160 of FIG. 11) of the AV. This sensor data can include, but is not limited to, GPS data. The detected location of the AV is then passed to block 1206.

In block 1204, an object (for example, vehicle 1003 of FIG. 10) is detected within proximity of the AV (for example, <100+ meters). This detection is made based on sensor data 1216 output from a camera (for example, camera 1162 of FIG. 11) of the AV and/or a lidar system (for example, lidar system 1164 of FIG. 11) of the AV. For example, image processing is performed to detect an instance of an object of a certain class (for example, a vehicle, cyclist or pedestrian) in an image. The image processing/object detection can be achieved in accordance with any known or to be known image processing/object detection algorithm. The lidar sensor data can include, but is not limited to, the superpixels generated in accordance with the above-described methods 400 and 900.

Additionally, a predicted trajectory is determined in block 1204 for the object. The object's trajectory is predicted in block 1204 based on the object's class, cuboid geometry(ies), cuboid heading(s) and/or contents of a map 1218 (for example, sidewalk locations, lane locations, lane directions of travel, driving rules, etc.). The manner in which the cuboid geometry(ies) and heading(s) are determined will become evident as the discussion progresses. At this time, it should be noted that the cuboid geometry(ies) and/or heading(s) are determined using sensor data of various types (for example, 2D images, 3D lidar point clouds) and a vector map 1218 (for example, lane geometries). Techniques for predicting object trajectories based on cuboid geometries and headings may include, for example, predicting that the object is moving on a linear path in the same direction as the heading direction of a cuboid. The predicted object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 1220 specifying the object's predicted trajectory, the cuboid geometry(ies)/heading(s) is provided to block 1206. In some scenarios, a classification of the object is also passed to block 1206. In block 1206, a vehicle trajectory is generated using the information from blocks 1202 and 1204. Techniques for determining a vehicle trajectory using cuboids may include, for example, determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 1208 can be determined based on the location information from block 1202, the object detection information from block 1204, and/or map information 1214 (which is pre-stored in a data store of the vehicle). The map information 1214 may include, but is not limited to, all or a portion of road map(s) 1060 of FIG. 10. The vehicle trajectory 1208 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 1208 is then provided to block 1210.

In block 1210, a steering angle and velocity command is generated based on the vehicle trajectory 1208. The steering angle and velocity command are provided to block 1210 for vehicle dynamics control, i.e., the steering angle and velocity command causes the AV to follow the vehicle trajectory 1208.

Figure 13:
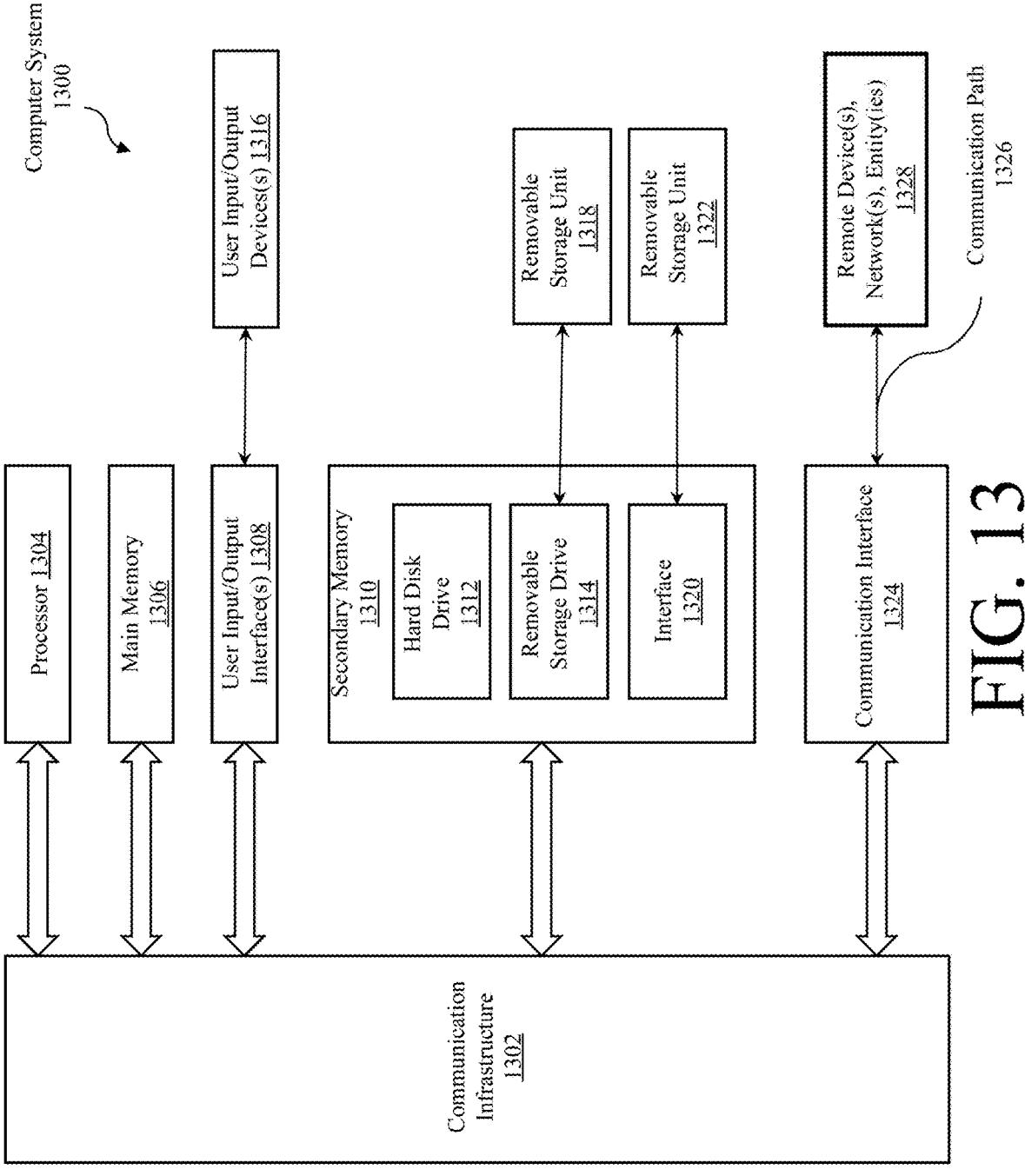
FIG. 13 provides an illustration of a computer system.

Various embodiments can be implemented, for example, using one or more computer systems, such as computer system 1300 shown in FIG. 13. Computer system 1300 can be any computer capable of performing the functions described in this document.

Computer system 1300 includes one or more processors (also called central processing units, or CPUs), such as a processor 1304. Processor 1304 is connected to a communication infrastructure or bus 1302. Optionally, one or more of the processors 1304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 also includes user input/output device(s) 1316, such as monitors, keyboards, pointing devices, etc., that communicate with communication infrastructure 1302 through user input/output interface(s) 1308.

Computer system 1300 also includes a main or primary memory 1306, such as random access memory (RAM). Main memory 1306 may include one or more levels of cache. Main memory 1306 has stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 1314 reads from and/or writes to removable storage unit 1318 in a well-known manner.

According to an example embodiment, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 1300, main memory 1306, secondary memory 1310, and removable storage units 1318 and 1322, as well as tangible articles of manufacture embodying any combination of the foregoing. Such control logic, when executed by one or more data processing devices (such as computer system 1300), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 13. In particular, embodiments can operate with software, hardware, and/or operating system implementations other than those described in this document.

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices which may be components of a single device or components of separate devices, together or collectively perform a process.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The features from different embodiments disclosed herein may be freely combined. For example, one or more features from a method embodiment may be combined with any of the system or product embodiments. Similarly, features from a system or product embodiment may be combined with any of the method embodiments herein disclosed.

What is claimed is:

1. A method for operating a lidar system, comprising:
arranging, by a processor, a plurality of pixels in a grid, the plurality of pixels comprising result values generated from processing waveforms produced by photodetectors of the lidar system;
identifying, by the processor, a first region of interest in the grid based on at least one of correlations between range values associated with the plurality of pixels and correlations between intensity values associated with the plurality of pixels;
combining, by the processor, result values associated with pixels located within the first region of interest to produce at least one first feature value;
generating, by the processor, a first superpixel having a value set to the at least one first feature value;
identifying a pixel of interest in the region of interest using a kernel; and
adjusting a size or a position of the region of interest in the grid to maximize a likelihood that the region of interest contains a greater number of pixels associated with an object,
wherein the size or position of the region of interest is adjusted based on the likelihood that the pixel of interest is associated with an edge point or a corner point on a surface of the object.

2. The method according to claim 1, wherein the first region of interest has at least one of a size or a shape that is different than a size or a shape of a second region of interest in the grid that is used to produce at least one second feature value.

3. The method according to claim 1, further comprising obtaining a kernel size and using the kernel size to identify the region of interest in the grid.

4. The method according to claim 3, wherein the kernel size is variable.

5. The method according to claim 4, wherein the obtaining the kernel size comprises:
locating ones of the plurality of pixels that are nearest neighbors to a pixel of interest in the grid in terms of at least range; and
defining the kernel size based on locations of the nearest neighbors in the grid.

6. The method according to claim 4, wherein the obtaining the kernel size comprises:
obtaining a reference kernel size;
identifying an area in the grid using the reference kernel size;
identifying a center pixel of the area;
computing a score for each said pixel in the area using the result values associated therewith, the score indicating a degree of correlation between result values associated with said pixel and said center pixel;
selecting pixels from the plurality of pixels based on the scores; and defining the kernel size based on locations of the selected pixels in the grid.

7. The method according to claim 6, wherein the score is a function of at least one of range, intensity and noise.

8. The method according to claim 1, wherein the pixel of interest is a center pixel of the region of interest.

9. The method according to claim 1, wherein the adjusting the size or position of the region of interest comprises:

identifying ones of the plurality of pixels that are nearest neighbor pixels to the pixel of interest in terms of at least range; and using a centroid of at least one of the nearest neighbor pixels to obtain a likelihood that the pixel of interest is associated with an edge point or a corner point on a surface of the object.

10. The method according to claim 1, further comprising disqualifying at least one pixel in the region of interest from aggregation with other pixels in the region of interest based on how far the at least one pixel is to the pixel of interest or a road surface in one or more dimensions, wherein the one or more dimensions comprises at least one of a range, an intensity, a noise and a confidence.

11. The method according to claim 1, further comprising using the first superpixel to control operations of an autonomous vehicle.

12. A system, comprising:

a processor;

a non-transitory computer-readable storage medium comprising programming instructions that are configured to cause the processor to implement a method for operating a lidar system, wherein the programming instructions comprise instructions to:

arrange a plurality of pixels in a grid, the plurality of pixels comprising result values generated from processing waveforms produced by photodetectors of the lidar system;

identify a first region of interest in the grid based on at least one of correlations between range values associated with the plurality of pixels and correlations between intensity values associated with the plurality of pixels;

combine result values associated with pixels located within the first region of interest to produce at least one first feature value;

generate a first superpixel having a value set to the at least one first feature value;

identify a pixel of interest in the region of interest using a kernel; and adjust a size or a position of the region of interest in the grid to maximize a likelihood that the region of interest contains a greater number of pixels associated with an object, wherein the size or position of the region of interest is adjusted based on the likelihood that the pixel of interest is associated with an edge point or a corner point on a surface of the object.

13. The system according to claim 12, wherein the programming instructions further comprise instructions to obtain a kernel size and use the kernel size to identify the region of interest in the grid.

14. The system according to claim 13, wherein the kernel size is obtained by:

locating ones of the plurality of pixels that are nearest neighbors to a pixel of interest in the grid in terms of at least range; and defining the kernel size based on locations of the nearest neighbors in the grid.

15. The system according to claim 13, wherein the kernel size is obtained by:

obtaining a reference kernel size;

identifying an area in the grid using the reference kernel size;

identifying a center pixel of the area;

computing a score for each said pixel in the area using the result values associated therewith, the score indicating a degree of correlation between result values associated with said pixel and said center pixel;

selecting pixels from the plurality of pixels based on the scores; and defining the kernel size based on locations of the selected pixels in the grid.

16. The system according to claim 12, wherein the size or position of the region of interest is adjusted by:

identifying ones of the plurality of pixels that are nearest neighbor pixels to a pixel of interest in terms of at least range; and using a centroid of at least one of the nearest neighbor pixels to obtain a likelihood that the pixel of interest is associated with an edge point or a corner point on a surface of the object.

17. A non-transitory computer-readable medium that stores instructions that are configured to, when executed by at least one computing device, cause the at least one computing device to perform operations comprising:

arranging a plurality of pixels in a grid, the plurality of pixels comprising result values generated from processing waveforms produced by photodetectors of a lidar system;

identifying a first region of interest in the grid based on at least one of correlations between range values associated with the plurality of pixels and correlations between intensity values associated with the plurality of pixels;

combining result values associated with pixels located within the first region of interest to produce at least one first feature value;

generating a first superpixel having a value set to the at least one first feature value;

identifying a pixel of interest in the region of interest using a kernel; and adjusting a size or a position of the region of interest in the grid to maximize a likelihood that the region of interest contains a greater number of pixels associated with an object, wherein the size or position of the region of interest is adjusted based on the likelihood that the pixel of interest is associated with an edge point or a corner point on a surface of the object.

* * * * *